US012492232B2

(12) United States Patent
Proud et al.

(10) Patent No.: US 12,492,232 B2
(45) Date of Patent: Dec. 9, 2025

(54) METHODS FOR PRODUCING PROTEINS

(71) Applicant: South Australian Health and Medical Research Institute Limited, Adelaide (AU)

(72) Inventors: Christopher Proud, Unley Park (AU); Jianling Xie, Clarence Gardens (AU); Stuart De Poi, North Adelaide (AU)

(73) Assignee: South Australian Health and Medical Research Institute Limited, Adelaide (AU)

( * ) Notice: Subject to any disclaimer, the term of this patent is extended or adjusted under 35 U.S.C. 154(b) by 995 days.

(21) Appl. No.: 17/276,443

(22) PCT Filed: Sep. 17, 2019

(86) PCT No.: PCT/AU2019/050993
§ 371 (c)(1),
(2) Date: Mar. 15, 2021

(87) PCT Pub. No.: WO2020/056456
PCT Pub. Date: Mar. 26, 2020

(65) Prior Publication Data
US 2023/0212237 A1   Jul. 6, 2023

(30) Foreign Application Priority Data
Sep. 17, 2018  (AU) ................. 2018903497

(51) Int. Cl.
*C07K 14/47* (2006.01)
*C12N 15/67* (2006.01)
*C12N 15/85* (2006.01)

(52) U.S. Cl.
CPC .......... *C07K 14/4702* (2013.01); *C12N 15/67* (2013.01); *C12N 15/85* (2013.01); *C07K 2319/23* (2013.01)

(58) Field of Classification Search
CPC ............ C07K 14/4702; C07K 2319/23; C07K 14/47; C12N 15/67; C12N 15/85; C12N 15/63
See application file for complete search history.

(56) References Cited

U.S. PATENT DOCUMENTS 5,227,301 A     7/1993   Turner et al.
2002/0168702 A1  11/2002  Fandl et al.

FOREIGN PATENT DOCUMENTS

WO   WO 2012/152945 A1   11/2012

OTHER PUBLICATIONS

Kyle S. MacLea et al. Rheb, an activator of target of rapamycin, in the blackback land crab, Gecarcinus lateralis: cloning and effects of molting and unweighting on expression in skeletal muscle. J Exp Biol Feb. 15, 2012; 215 (4): 590-604. doi: https://doi.org/10.1242/jeb.062869 (Year: 2012).*
Parmar N, Tamanoi F. Rheb G-Proteins and the Activation of mTORC1. Enzymes. 2010;27:39-56. doi: 10.1016/S1874-6047(10) 27003-8 (Year: 2010).*
Mazhab-Jafari, M. T., Marshall, C. B., Ishiyama, N., Ho, J., Di Palma, V., Stambolic, V., & Ikura, M. (2012). An autoinhibited noncanonical mechanism of GTP hydrolysis by Rheb maintains mTORC1 homeostasis. Structure, 20(9), 1528-1539. (Year: 2012).*
Wang, Y., et al. "Inhibition of MAPK pathway is essential for suppressing Rheb-Y35N driven tumor growth." Oncogene 36.6 (2017): 756-765 and pp. 1/17-17/17 of Supplementary Information, 2017, Epub Jul. 11, 2016. (Year: 2017).*
Dreesen, I. A., & Fussenegger, M. (2011). Ectopic expression of human mTOR increases viability, robustness, cell size, proliferation, and antibody production of chinese hamster ovary cells. Biotechnology and bioengineering, 108(4), 853-866. (Year: 2011).*
Yuan, Jian, et al. "Identification and characterization of RHEBL1, a novel member of Ras family, which activates transcriptional activities of NF-kappa B." Molecular biology reports 32 (2005): 205-214. (Year: 2005).*
NCBI NM_144593.3, Homo sapiens RHEB like 1 (RHEBL1), transcript variant 1, mRNA, printed as pp. 1-4, Nov. 23, 2018 (Year: 2018).*
NCBI JH000263, Cricetulus griseus cell line CHO-K1 unplaced genomic scaffold scaffold19, whole genome shotgun sequence, printed as pp. 1-7, Jul. 25, 2016 (Year: 2016).*
Xu, Xun, et al. "The genomic sequence of the Chinese hamster ovary (CHO)-K1 cell line." Nature biotechnology 29.8 (2011): 735-741. (Year: 2011).*
Lee, J. S., Grav, L. M., Lewis, N. E., & Faustrup Kildegaard, H. (2015). CRISPR/Cas9-mediated genome engineering of CHO cell factories: Application and perspectives. Biotechnology journal, 10(7), 979-994. (Year: 2015).*
Marshall, C. B., Mazhab-Jafari, M. T., Stambolic, V., & Ikura, M. (2014). Structure and function of the mTOR activator Rheb. In Ras Superfamily Small G Proteins: Biology and Mechanisms 1: General Features, Signaling (pp. 281-324). Vienna: Springer Vienna. ( Year: 2014).*
Kotyada, C., Maulik, A., Srivastava, A., & Singh, M. (2017). Mechanistic Insights into the Differential Catalysis by RheB and Its Mutants: Y35A and Y35A-D65A. ACS omega, 2(10), 6691-6702. (Year: 2017).*
Heard et al., "An oncogenic mutant of RHEB, RHEB Y35N, exhibits an altered interaction with BRAF resulting in cancer transformation," *BMC Cancer*, vol. 18, No. 69, 2018 (11 pages).
Hein et al., "A novel fluorescent probe reveals starvation controls the commitment of amyloid precursor protein to the lysosome," *BBA—Molecular Cell Research*, vol. 1864, pp. 1554-1565, 2017.
Maclea et al., "Rheb, an activator of target of rapamycin, in the blackback land crab, *Gecarcinus lateralis*: cloning and effects of molting and unweighting on expression in skeletal muscle," *The Journal of Experimental Biology*, vol. 215, pp. 590-604, 2012.

(Continued)

*Primary Examiner* — Jennifer Dunston
*Assistant Examiner* — Christina Tran
(74) *Attorney, Agent, or Firm* — Klarquist Sparkman, LLP

(57) ABSTRACT

Methods for producing proteins, cells for producing proteins, and methods for producing cells with improved protein production are provided. Methods of producing a selected protein, including expressing the selected protein in a cell expressing a Rheb (Ras homologue enriched in brain) protein having an activity to increase protein production in the cell, and secreting the selected protein from the cell, thereby producing the protein are provided.

7 Claims, 14 Drawing Sheets

Specification includes a Sequence Listing.

(56) References Cited

OTHER PUBLICATIONS

Wang et al., "Rheb activates protein synthesis and growth in adult rat ventricular cardiomyocytes," *Journal of Molecular and Cellular Cardiology*, vol. 45, pp. 812-820, 2008.
De Poi et al., "Constitutively active Rheb mutants [T23M] and [E40K] drive increased production and secretion of recombinant protein in Chinese hamster ovary cells," *Biotechnology and Bioengineering*, vol. 118, No. 7, pp. 2422-2434, 2021.
Extended European Search Report dated May 19, 2022, issued for European Patent Application No. 19861484.4 (11 pages).
UNIPROT Accession No. Q56JV3, GTP-binding protein Rheb, dated Sep. 12, 2018 (2 pages).
Wang and Proud, "The mTOR Pathway in the Control of Protein Synthesis," *Physiology*, vol. 21, No. 5, pp. 362-369, 2006.
Wang et al., "Rheb activates protein synthesis and growth in adult rat ventricular cardiomyocytes," *Journal of Molecular and Cellular Cardiology*, vol. 45, No. 6, pp. 812-820, 2008.
Xie et al., "TSC-insensitive Rheb mutations induce oncogenic transformation through a combination of constitutively active mTORC1 signalling and proteome remodelling," *Cellular and Molecular Life Sciences*, vol. 78, pp. 4035-4052, 2021.
Yu et al., "Structural Basis for the Unique Biological Function of Small GTPase RHEB," *Journal of Biological Chemistry*, vol. 280, No. 17, pp. 17093-17100, 2005.
European Examination Report dated Feb. 22, 2024, issued for European Patent Application No. 19861484.4 (5 pages).
Communication pursuant to Article 94(3) EPC issued for European Application No. 19861484.4, on Apr. 17, 2025 (6 pages).
Monzani et al., "Transgenic bovine as bioreactors: Challenges and perspectives," *Bioengineered*, vol. 7, No. 3, pp. 123-131, 2016.

\* cited by examiner

A

B

A

B

SEQUENCE LISTING

<160> NUMBER OF SEQ ID NOS: 11

<210> SEQ ID NO 1
<211> LENGTH: 981
<212> TYPE: DNA
<213> ORGANISM: Homo sapiens

<400> SEQUENCE: 1

| | | | | | |
|---|---|---|---|---|---|
| ctgaggaggc | cgccaagatg | ccgcagtcca | agtcccggaa | gatcgcgatc | ctgggctacc | 60 |
| ggtctgtggg | gaaatcctca | ttgacgattc | aatttgttga | aggccaattt | gtggactcct | 120 |
| acgatccaac | catagaaaac | actttttacaa | agttgatcac | agtaaatgga | caagaatatc | 180 |
| atcttcaact | tgtagacaca | gccgggcaag | atgaatattc | tatctttcct | cagacatact | 240 |
| ccatagatat | taatggctat | attcttgtgt | attctgttac | atcaatcaaa | agttttgaag | 300 |
| tgattaaagt | tatccatggc | aaattgttgg | atatggtggg | gaaagtacaa | atacctatta | 360 |
| tgttggtttg | gaataagaaa | gacctgcata | tggaaagggt | gatcagttat | gaagaaggga | 420 |
| aagctttggc | agaatcttgg | aatgcagctt | ttttggaatc | ttctgctaaa | gaaaatcaga | 480 |
| ctgctgtgga | tgtttttcga | aggataattt | tggaggcaga | aaaaatggac | ggggcagctt | 540 |
| cacaaggcaa | gtcttcatgc | tcggtgatgt | gattctgctg | caaagcctga | ggacactggg | 600 |
| aatatattct | acctgaagaa | gcaaactgcc | cgttctcctt | gaagataaac | tatgcttctt | 660 |
| ttttcttctg | ttaacctgaa | agatatcatt | tgggtcagag | ctcccctccc | ttcagattat | 720 |
| gttaactctg | agtctgtcca | aatgagttca | cttccatttt | caaattttaa | gcaatcatat | 780 |
| tttcaattta | tatattgtat | ttcttaatat | tatgaccaag | aatttatcg | gcattaattt | 840 |
| ttcagtgtag | tttgttgttt | aaaataatgt | aatcatcaaa | atgatgcata | ttgttacact | 900 |
| actattaact | aggcttcagt | atatcagtgt | ttatttcatt | gtgttaaatg | tatacttgta | 960 |
| aataaaatag | ctgcaaacct | c | | | | 981 |

<210> SEQ ID NO 2
<211> LENGTH: 184
<212> TYPE: PRT
<213> ORGANISM: Homo sapiens

<400> SEQUENCE: 2

Met Pro Gln Ser Lys Ser Arg Lys Ile Ala Ile Leu Gly Tyr Arg Ser
1               5                   10                  15

Val Gly Lys Ser Ser Leu Thr Ile Gln Phe Val Glu Gly Gln Phe Val
            20                  25                  30

Asp Ser Tyr Asp Pro Thr Ile Glu Asn Thr Phe Thr Lys Leu Ile Thr
        35                  40                  45

Val Asn Gly Gln Glu Tyr His Leu Gln Leu Val Asp Thr Ala Gly Gln
    50                  55                  60

Asp Glu Tyr Ser Ile Phe Pro Gln Thr Tyr Ser Ile Asp Ile Asn Gly
65                  70                  75                  80

Tyr Ile Leu Val Tyr Ser Val Thr Ser Ile Lys Ser Phe Glu Val Ile
                85                  90                  95

Lys Val Ile His Gly Lys Leu Leu Asp Met Val Gly Lys Val Gln Ile
            100                 105                 110

Pro Ile Met Leu Val Gly Asn Lys Lys Asp Leu His Met Glu Arg Val
        115                 120                 125

Ile Ser Tyr Glu Glu Gly Lys Ala Leu Ala Glu Ser Trp Asn Ala Ala
    130                 135                 140

```
Phe Leu Glu Ser Ser Ala Lys Glu Asn Gln Thr Ala Val Asp Val Phe
145                 150                 155                 160

Arg Arg Ile Ile Leu Glu Ala Glu Lys Met Asp Gly Ala Ala Ser Gln
                165                 170                 175

Gly Lys Ser Ser Cys Ser Val Met
            180

<210> SEQ ID NO 3
<211> LENGTH: 184
<212> TYPE: PRT
<213> ORGANISM: Homo sapiens

<400> SEQUENCE: 3

Met Pro Gln Ser Lys Ser Arg Lys Ile Ala Ile Leu Gly Tyr Arg Ser
1               5                   10                  15

Val Gly Lys Ser Ser Leu Met Ile Gln Phe Val Glu Gly Gln Phe Val
                20                  25                  30

Asp Ser Tyr Asp Pro Thr Ile Glu Asn Thr Phe Thr Lys Leu Ile Thr
            35                  40                  45

Val Asn Gly Gln Glu Tyr His Leu Gln Leu Val Asp Thr Ala Gly Gln
50                  55                  60

Asp Glu Tyr Ser Ile Phe Pro Gln Thr Tyr Ser Ile Asp Ile Asn Gly
65                  70                  75                  80

Tyr Ile Leu Val Tyr Ser Val Thr Ser Ile Lys Ser Phe Glu Val Ile
                85                  90                  95

Lys Val Ile His Gly Lys Leu Leu Asp Met Val Gly Lys Val Gln Ile
                100                 105                 110

Pro Ile Met Leu Val Gly Asn Lys Lys Asp Leu His Met Glu Arg Val
            115                 120                 125

Ile Ser Tyr Glu Glu Gly Lys Ala Leu Ala Glu Ser Trp Asn Ala Ala
130                 135                 140

Phe Leu Glu Ser Ser Ala Lys Glu Asn Gln Thr Ala Val Asp Val Phe
145                 150                 155                 160

Arg Arg Ile Ile Leu Glu Ala Glu Lys Met Asp Gly Ala Ala Ser Gln
                165                 170                 175

Gly Lys Ser Ser Cys Ser Val Met
            180

<210> SEQ ID NO 4
<211> LENGTH: 184
<212> TYPE: PRT
<213> ORGANISM: Homo sapiens

<400> SEQUENCE: 4

Met Pro Gln Ser Lys Ser Arg Lys Ile Ala Ile Leu Gly Tyr Arg Ser
1               5                   10                  15

Val Gly Lys Ser Ser Leu Thr Ile Gln Phe Val Glu Gly Gln Phe Val
                20                  25                  30

Asp Ser Asn Asp Pro Thr Ile Glu Asn Thr Phe Thr Lys Leu Ile Thr
            35                  40                  45

Val Asn Gly Gln Glu Tyr His Leu Gln Leu Val Asp Thr Ala Gly Gln
50                  55                  60

Asp Glu Tyr Ser Ile Phe Pro Gln Thr Tyr Ser Ile Asp Ile Asn Gly
65                  70                  75                  80

Tyr Ile Leu Val Tyr Ser Val Thr Ser Ile Lys Ser Phe Glu Val Ile
                85                  90                  95
```

-continued

```
Lys Val Ile His Gly Lys Leu Leu Asp Met Val Gly Lys Val Gln Ile
                100                 105                 110
Pro Ile Met Leu Val Gly Asn Lys Lys Asp Leu His Met Glu Arg Val
            115                 120                 125
Ile Ser Tyr Glu Glu Gly Lys Ala Leu Ala Glu Ser Trp Asn Ala Ala
        130                 135                 140
Phe Leu Glu Ser Ser Ala Lys Glu Asn Gln Thr Ala Val Asp Val Phe
145                 150                 155                 160
Arg Arg Ile Ile Leu Glu Ala Glu Lys Met Asp Gly Ala Ala Ser Gln
                165                 170                 175
Gly Lys Ser Ser Cys Ser Val Met
            180

<210> SEQ ID NO 5
<211> LENGTH: 184
<212> TYPE: PRT
<213> ORGANISM: Homo sapiens

<400> SEQUENCE: 5

Met Pro Gln Ser Lys Ser Arg Lys Ile Ala Ile Leu Gly Tyr Arg Ser
1               5                   10                  15
Val Gly Lys Ser Ser Leu Thr Ile Gln Phe Val Glu Gly Gln Phe Val
            20                  25                  30
Asp Ser Tyr Asp Pro Thr Ile Lys Asn Thr Phe Thr Lys Leu Ile Thr
        35                  40                  45
Val Asn Gly Gln Glu Tyr His Leu Gln Leu Val Asp Thr Ala Gly Gln
    50                  55                  60
Asp Glu Tyr Ser Ile Phe Pro Gln Thr Tyr Ser Ile Asp Ile Asn Gly
65                  70                  75                  80
Tyr Ile Leu Val Tyr Ser Val Thr Ser Ile Lys Ser Phe Glu Val Ile
                85                  90                  95
Lys Val Ile His Gly Lys Leu Leu Asp Met Val Gly Lys Val Gln Ile
                100                 105                 110
Pro Ile Met Leu Val Gly Asn Lys Lys Asp Leu His Met Glu Arg Val
            115                 120                 125
Ile Ser Tyr Glu Glu Gly Lys Ala Leu Ala Glu Ser Trp Asn Ala Ala
        130                 135                 140
Phe Leu Glu Ser Ser Ala Lys Glu Asn Gln Thr Ala Val Asp Val Phe
145                 150                 155                 160
Arg Arg Ile Ile Leu Glu Ala Glu Lys Met Asp Gly Ala Ala Ser Gln
                165                 170                 175
Gly Lys Ser Ser Cys Ser Val Met
            180

<210> SEQ ID NO 6
<211> LENGTH: 39
<212> TYPE: DNA
<213> ORGANISM: Artificial Sequence
<220> FEATURE:
<223> OTHER INFORMATION: RHEB_T23M_FORWARD

<400> SEQUENCE: 6
gccttcaaca aattgaatca tcaatgagga tttccccac                              39

<210> SEQ ID NO 7
<211> LENGTH: 39
<212> TYPE: DNA
<213> ORGANISM: Artificial Sequence
```

-continued

```
<220> FEATURE:
<223> OTHER INFORMATION: RHEB_T23M_REVERSE

<400> SEQUENCE: 7
gtggggaaat cctcattgat gattcaattt gttgaaggc                              39

<210> SEQ ID NO 8
<211> LENGTH: 42
<212> TYPE: DNA
<213> ORGANISM: Artificial Sequence
<220> FEATURE:
<223> OTHER INFORMATION: RHEB_Y35N_FORWARD

<400> SEQUENCE: 8
gaaggccaat tgtggactc caacgatcca accatagaaa ac                           42

<210> SEQ ID NO 9
<211> LENGTH: 42
<212> TYPE: DNA
<213> ORGANISM: Artificial Sequence
<220> FEATURE:
<223> OTHER INFORMATION: RHEB_Y35N_REVERSE

<400> SEQUENCE: 9
gttttctatg gttggatcgt tggagtccac aaattggcct tc                          42

<210> SEQ ID NO 10
<211> LENGTH: 40
<212> TYPE: DNA
<213> ORGANISM: Artificial Sequence
<220> FEATURE:
<223> OTHER INFORMATION: RHEB_E40K_FORWARD

<400> SEQUENCE: 10
ctcctacgat ccaaccataa aaacactttt acaaagttg                              40

<210> SEQ ID NO 11
<211> LENGTH: 40
<212> TYPE: DNA
<213> ORGANISM: Artificial Sequence
<220> FEATURE:
<223> OTHER INFORMATION: RHEB_E40K_REVERSE

<400> SEQUENCE: 11
caactttgta aaagtgtttt ttatggttgg atcgtaggag                             40
```

METHODS FOR PRODUCING PROTEINS

PRIORITY CLAIM

This application is the § 371 U.S. National Stage of International Application No. PCT/AU2019/050993, filed Sep. 17, 2019, which was published in English under PCT Article 21(2), which in turn claims priority to Australian Provisional Patent Application 2018903497, filed 17 Sep. 2018, the content of which is hereby incorporated by reference in its entirety.

SEQUENCE LISTING

The Sequence Listing is submitted as an ASCII text file in the form of the file named Sequence_Listing.txt, which was created on Mar. 15, 2021, and is ~9 kilobytes, which is incorporated by reference herein.

FIELD

The present disclosure relates to methods for producing proteins. The present disclosure also relates to cells for producing proteins and methods for producing cells with improved protein production.

BACKGROUND

The production of proteins is important in many fields. In some cases, the ability to improve the yield of a protein being produced is highly desirable, particularly in cases where there are economic reasons for improving protein production.

In addition, there is an increasing need to be able to produce proteins in moderate to large quantities, particularly as increased quantities of pure proteins are required to meet the demand for proteins of therapeutic value. For example, the amount of therapeutic hormones and growth factors (e.g. insulin and growth hormone) used worldwide has increased significantly in recent times, and is anticipated to continue increasing.

In the field of basic science, there is also an increasing need for the ability to produce increased amounts of proteins, particularly in the areas of crystallography and structure determination.

Many of the most important drugs now available are protein-based drugs. Aside from therapeutic hormones and growth factors, drugs based on monoclonal antibodies are already some of the most commercially important treatments for many conditions, such as cancer. With the increasing number of protein therapeutic candidates, especially monoclonal antibodies, entering various stages of development there is a significant need for improvements in their production.

In terms of the manufacturing process for therapeutic proteins, the ability to produce increased amounts of a protein is important for a variety of reasons, such as meeting demand, maintaining cost effectiveness, and providing manufacturing flexibility.

Advances in the field of molecular biology have enabled the production of large quantities of proteins by overexpressing polynucleotides encoding the protein-of-interest in various host cells, particularly in eukaryotic cells such as yeasts, insects and mammalian cells. Mammalian expression systems in particular provide the advantages of correct protein folding and appropriate post-translational modifications for many proteins. However, expression in mammalian cells can often result in low protein yields.

It is recognised that in order to improve the amount and quality of expressed proteins, particularly at the scale of production needed for therapeutic proteins, a variety of improvements to the technology need to be employed.

Accordingly, there is a continuing need to develop new technologies that can be used to improve protein expression. These technologies include, for example, the identification of specific cell types with improved protein production characteristics, the ability to engineer protein production systems to improve secretion of proteins into the culture supernatant, and the use of improved culture media.

SUMMARY

The present disclosure relates to methods for producing proteins. The present disclosure also relates to cells for producing proteins and methods for producing cells with improved protein production.

Certain embodiments of the present disclosure provide a method of producing a selected protein, the method comprising:
   expressing the selected protein in a cell expressing a Rheb (Ras homologue enriched in brain) protein having an activity to increase protein production in the cell; and
   secreting the selected protein from the cell;
   thereby producing the protein.

Certain embodiments of the present disclosure provide a method of producing a secreted protein, the method comprising:
   expressing the protein to be secreted in a cell expressing a Rheb protein having an activity to increase protein production from the cell and secreting the protein from the cell;
   thereby producing the secreted protein.

Certain embodiments of the present disclosure provide a method of producing a secreted protein, the method comprising:
   expressing the protein to be secreted in a cell expressing a Rheb protein comprising a methionine at amino acid residue 23, and/or an asparagine at amino acid residue 35, and/or a lysine at amino acid residue 40 of the protein, and secreting the protein from the cell;
   thereby producing the secreted protein.

Certain embodiments of the present disclosure provide a protein produced by a method as described herein.

Certain embodiments of the present disclosure provide a method of improving secretion of a secretable protein, the method comprising expressing the secretable protein in a cell expressing a Rheb protein having an activity to increase protein secretion from a cell, thereby improving secretion of the secretable protein.

Certain embodiments of the present disclosure provide a method of improving secretion of a secretable protein, the method comprising expressing the secretable protein in a cell expressing a Rheb protein comprising a methionine at amino acid residue 23, and/or an asparagine at amino acid residue 35, and/or a lysine at amino acid residue 40 of the protein, thereby improving secretion of the secretable protein from the cell.

Certain embodiments of the present disclosure provide a method of improving secretion of proteins by a cell, the method comprising expressing in the cell a Rheb protein having an activity to increase protein secretion in the cell, thereby improving secretion of proteins by the cell.

Certain embodiments of the present disclosure provide a method of improving secretion of proteins by a cell, the method comprising expressing in the cell a Rheb protein comprising a methionine at amino acid residue 23, and/or an asparagine at amino acid residue 35, and/or a lysine at amino acid residue 40 of the protein, thereby improving secretion of proteins by the cell.

Certain embodiments of the present disclosure provide a method of producing a cell with improved secretion of proteins, the method comprising expressing in the cell a Rheb protein having an activity to increase protein secretion in the cell, thereby producing a cell with improved secretion of proteins.

Certain embodiments of the present disclosure provide a method of producing a cell with improved secretion of proteins, the method comprising expressing in the cell a Rheb protein comprising a methionine at amino acid residue 23, and/or an asparagine at amino acid residue 35, and/or a lysine at amino acid residue 40 of the protein, thereby producing a cell with improved secretion of proteins.

Certain embodiments of the present disclosure provide a method of producing a cell with improved secretion of proteins, the method comprising introducing a mutation into a Rheb nucleic acid to express a Rheb protein to increase protein secretion in the cell, thereby producing a cell with improved secretion of proteins.

Certain embodiments of the present disclosure provide a cell with improved secretion of proteins produced by a method described herein.

Certain embodiments of the present disclosure provide a method of conferring serum-independent growth on a cell, the method comprising expressing in the cell a Rheb protein comprising a methionine at amino acid residue 23 of the protein and thereby conferring serum-independent growth on the cell.

Certain embodiments of the present disclosure provide a method of producing a cell comprising a characteristic of improved serum-independent growth, the method comprising expressing in the cell a Rheb protein comprising a methionine at amino acid residue 23 of the protein and thereby improving serum-independent growth of the cell.

Certain embodiments of the present disclosure provide a method of producing a cell comprising a characteristic of improved serum-independent growth, the method comprising introducing a mutation into a Rheb nucleic acid to express a Rheb protein comprising a methionine at amino acid residue 23 in the cell, thereby producing a cell with improved serum-independent growth.

Certain embodiments of the present disclosure provide a cell with serum-independent growth produced by a method as described herein.

Certain embodiments of the present disclosure provide a cell comprising a recombinant nucleic acid encoding a Rheb protein having an activity to increase production of proteins in the cell and/or comprising a recombinant nucleic acid for introducing a mutation into a nucleic acid encoding a Rheb protein to increase production of proteins in the cell.

Certain embodiments of the present disclosure provide a cell expressing a recombinant Rheb protein having an activity to increase production of proteins in the cell.

Certain embodiments of the present disclosure provide a cell genetically engineered to introduce a mutation into a Rheb nucleic acid which improves production of proteins in the cell.

Certain embodiments of the present disclosure provide a recombinant vector comprising a nucleic acid encoding a Rheb protein, or a part thereof, which improves production of proteins in a cell.

Certain embodiments of the present disclosure provide a cell comprising a vector as described herein.

Certain embodiments of the present disclosure provide a non-human animal comprising one or more cells engineered to express a Rheb protein having an activity to increase protein production in the one or more cells.

Certain embodiments of the present disclosure provide a guide RNA comprising one or more nucleotides for introducing a mutation into a Rheb nucleic acid to produce a Rheb protein that increases production of proteins in a cell.

Certain embodiments of the present disclosure provide a method of introducing a mutation into a cell, the method comprising using a guide RNA as described herein to introduce the mutation into the cell.

Certain embodiments of the present disclosure provide a cell comprising a guide RNA as described herein.

Certain embodiments of the present disclosure provide a method of producing a selected protein, the method comprising expressing the selected protein in a cell as described herein and thereby producing the selected protein.

Certain embodiments of the present disclosure provide a system for producing a protein, the system comprising a bioreactor comprising cells expressing a Rheb protein having an activity to increase production of proteins in the cells.

Certain embodiments of the present disclosure provide a protein produced using a system as described herein.

Certain embodiments of the present disclosure provide a method of identifying a mutation in a Rheb protein to improve secretion of proteins, the method comprising:
expressing in a cell a Rheb protein with a candidate mutation; and
identifying the candidate mutation as a mutation in the Rheb protein to improve secretion of proteins.

Certain embodiments of the present disclosure provide a method of identifying a mutation in a Rheb protein to confer serum-independent growth on a cell, the method comprising:
expressing in a cell a Rheb protein with a candidate mutation; and
identifying the mutation as a mutation in the Rheb protein to confer serum-independent growth on the cell.

Other embodiments are disclosed herein.

BRIEF DESCRIPTION OF THE FIGURES

Certain embodiments are illustrated by the following figures. It is to be understood that the following description is for the purpose of describing particular embodiments only, and is not intended to be limiting with respect to the description.

FIGS. 1A-1B: Recombinant GST-Rheb proteins were subjected to GAP assay in the presence of FLAG-TSC1, FLAG-TSC2 and [$\alpha$-$^{32}$P] GTP. GST-Rheb bound to GDP or GTP was pulled down using glutathione beads and the nucleotides were then separated by thin-layer chromatography and visualized by phosphorimager. The positions of GDP and GTP are shown (FIG. 1A). Incubation with FLAG-TSC1 and FLAG-TSC2 led to hydrolysis of Rheb-GTP into Rheb-GDP, however, incubation with FLAG-TSC1 and FLAG-TSC2 did not promote hydrolysis of GTP bound to the S21L, T23M, Y35N, E40K and G63A mutants, while a small degree of hydrolysis was seen for G29S and Q64L (***=p<0.001 compared to WT for n=3) FIG. 1B). FIGS. 1C-1D: CHO cells were co-transfected using Lipofectamine 3000 with vectors encoding wildtype (WT) Rheb or the indicated mutants and TSC1/2 as indicated. 36 h after transfection, cells were transferred to Ham's F12 media lacking FBS for 16 h. Cells were the transferred to Dulbecco's phosphate-buffered saline (D-PBS, which lacks amino acids) for 1 h before cell lysates were harvested for SDS-PAGE and Western Blotting analysis using the indicated antibodies. CHO cells overexpressing Rheb-WT maintained mTORC1 signalling to the mTORC1 effectors S6K1 and rpS6 in the absence of upstream activators (serum and amino acids); however, mTORC1 signalling was suppressed when cells were co-transfected with TSC1/TSC2. Rheb-S21L, T23M, G29S, Y35N and E40K showed increased mTORC1 signalling compared to the cell transfected with empty vector or expressing Rheb-WT even when upstream activation of the pathway was removed by starvation. This effect is consistent with lack of sensitivity of the mutant Rhebs to TSC1/TSC2. Thus the Rheb mutants S21L, T23M, G29S, Y35N and E40K promote mTORC1 signalling in the absence of upstream activation due to insensitivity to the GAP activity of the TSC complex.

FIG. 5A shows ExpiCHO-S™ stably expressing Rheb-T23M and Rheb-E40K increased the yield of rabbit IgG compared to both Rheb-WT or Rheb-Y35N achieving a yield of 5-6 g/L compared to 2-3 g/L. Data represent the mean of 3 biological replicates ±standard deviation. FIG. 5B shows the accumulation of secreted rabbit IgG determined daily over the course of 10 days. Cells expressing Rheb-T23M and Rheb-E40K maintain a constant rate of IgG secretion over a longer period than cells expressing Rheb-WT or Rheb-Y35N resulting in a greater yield. Data represent the results of a single replicate. FIG. 5C is a Western blot analysis for markers of mTORC1 signaling and ER Stress activation markers showing increased mTORC1 signalling and a mild ER stress response in cells stably expressing Rheb-T23M or E40K.

DETAILED DESCRIPTION

Figure 1:
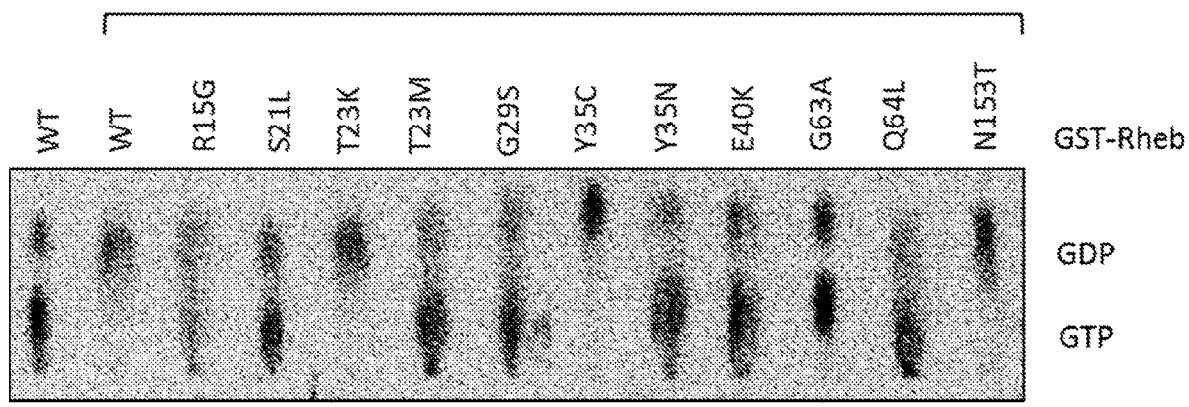
FIGS. 1A-1D show that Rheb mutants S21L, T23M, G29S, Y35N and E40K promote mTORC1 signalling in the absence of upstream activation due to insensitivity to the GAP activity of the TSC complex.
Figure 1:
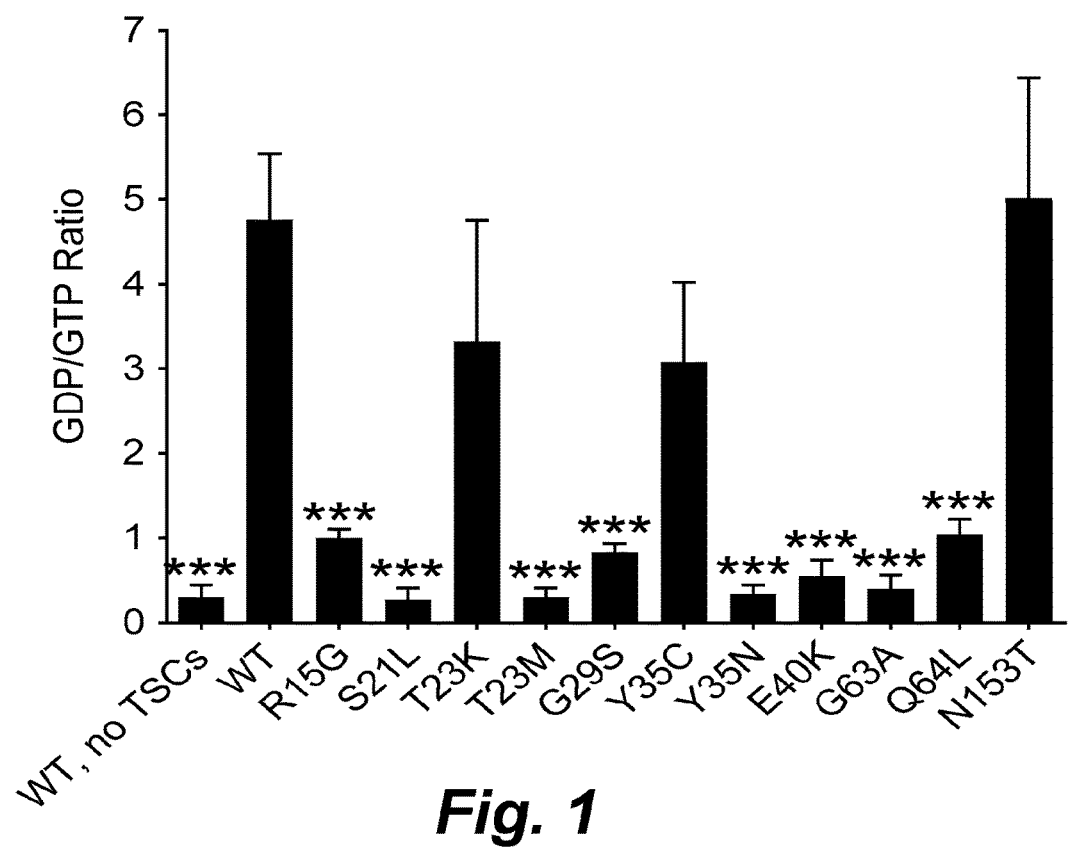
Figure 1:
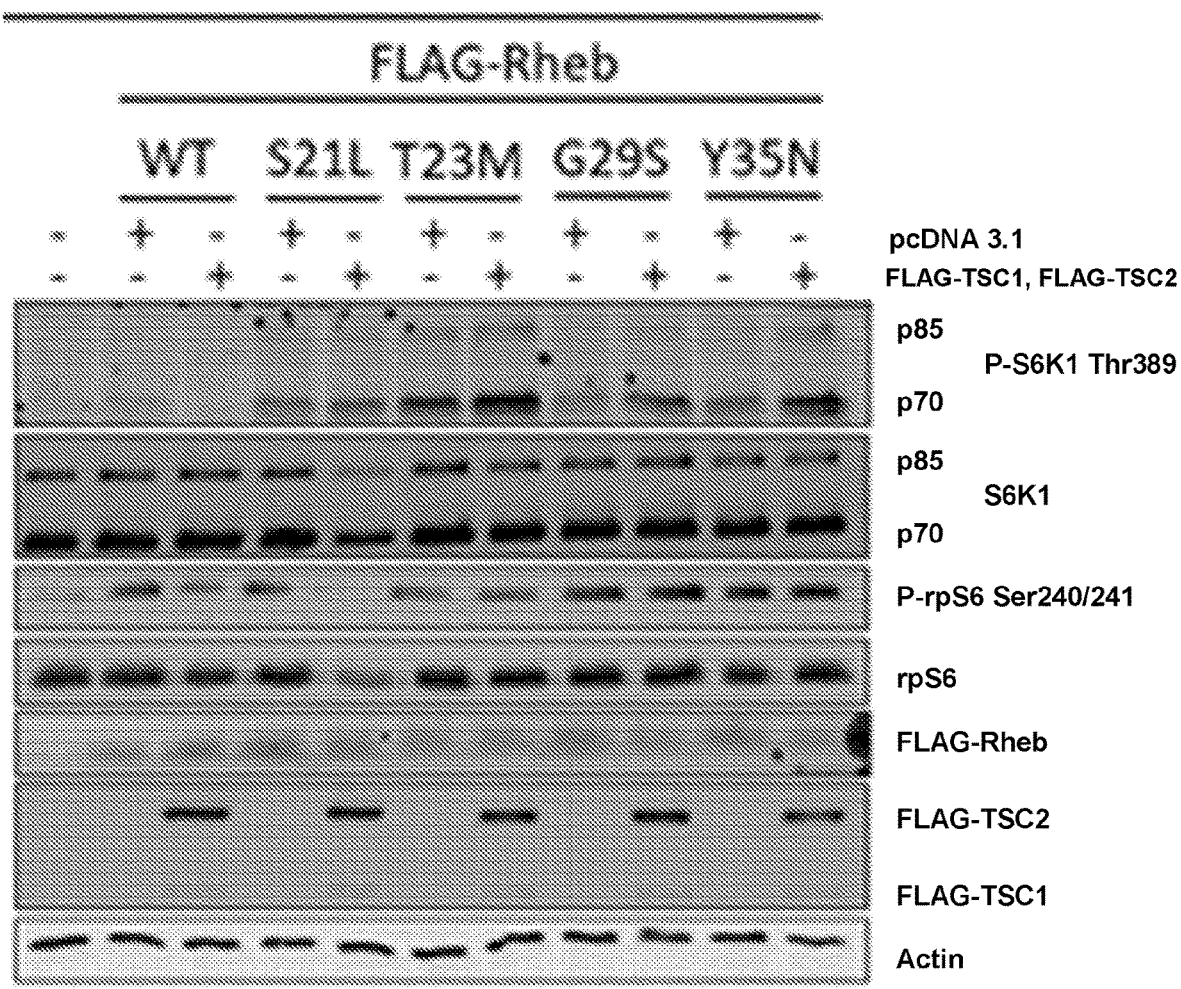
Figure 1:
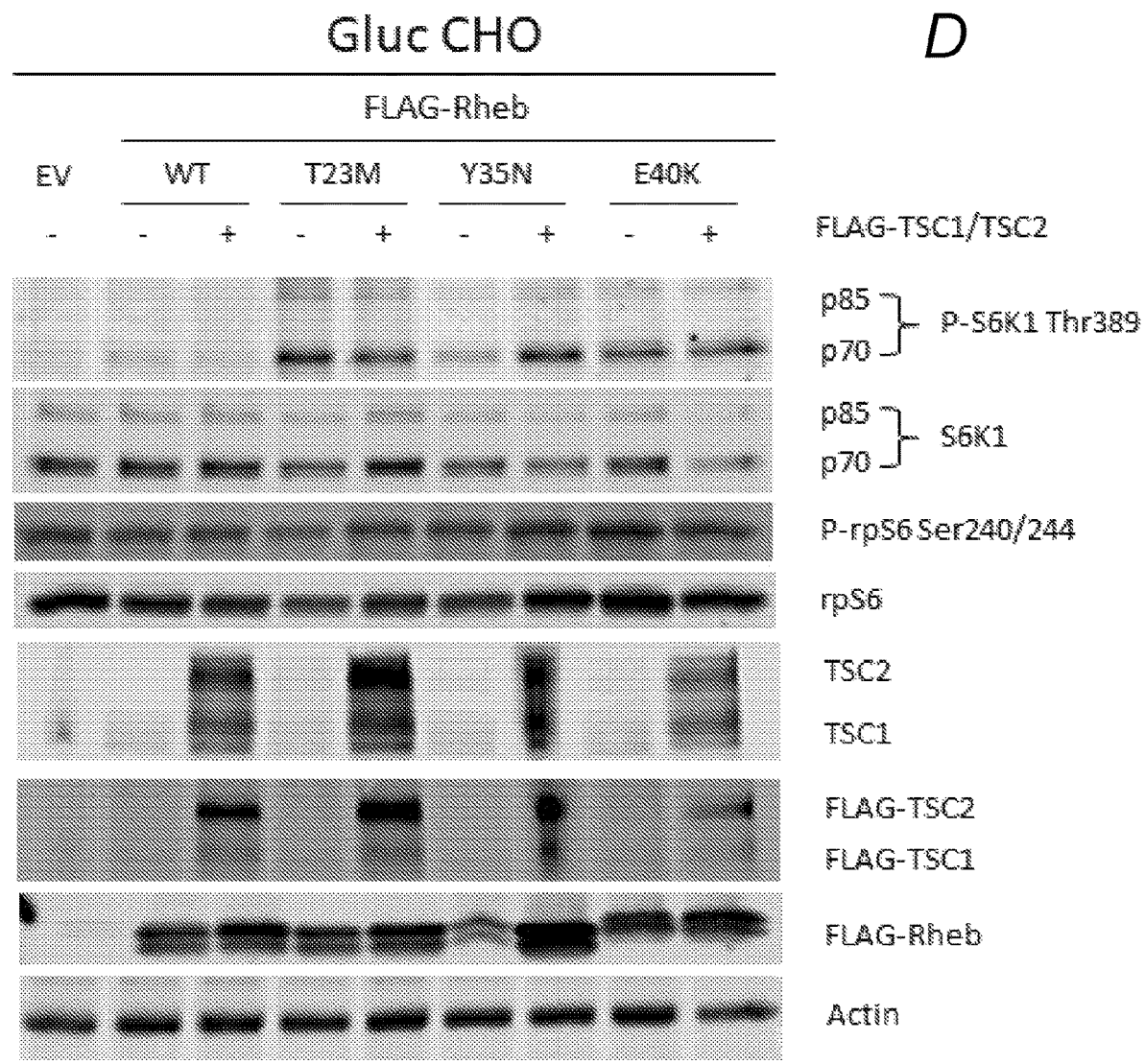

The present disclosure relates to methods for producing proteins. The present disclosure also relates to cells for producing proteins, and methods for producing cells with improved protein production.

The present disclosure is based on the recognition that expression of selected mutations in the Rheb protein (Ras homologue enriched in brain) in a cell significantly increases secretion of expressed proteins in the cell. In addition, it has also been found that some mutations also confer serum independent growth on the cell. Thus, the selected mutations in the Rheb protein impart improved characteristics to cells for the production of proteins.

Certain embodiments of the present disclosure provide methods for producing proteins.

In certain embodiments, the present disclosure provides a method of producing a selected protein, the method comprising expressing the selected protein in a cell expressing a Rheb protein having an activity to increase protein production in the cell, and thereby produced the selected protein.

The identifier for the human Rheb gene in the HGNC database is HGNC:10011. The protein has a single isoform in the human (UniProtKB—Q15382-1). Orthologues, paralogues and homologues of the gene can be readily identified, for example by using the BLAST suite of algorithms. The DNA sequence corresponding to the human mRNA is provided by Genbank NM_005614.3 and is provided below (SEQ ID NO. 1):

(SEQ ID NO. 1)
CTGAGGAGGCCGCCAAGATGCCGCAGTCCAAGTCCCGGAAGATCGCGAT

CCTGGGCTACCGGTCTGTGGGGAAATCCTCATTGACGATTCAATTTGTT

GAAGGCCAATTTGTGGACTCCTACGATCCAACCATAGAAAACACTTTTA

CAAAGTTGATCACAGTAAATGGACAAGAATATCATCTTCAACTTGTAGA

CACAGCCGGGCAAGATGAATATTCTATCTTTCCTCAGACATACTCCATA

GATATTAATGGCTATATTCTTGTGTATTCTGTTACATCAATCAAAAGTT

TTGAAGTGATTAAAGTTATCCATGGCAAATTGTTGGATATGGTGGGGAA

AGTACAAATACCTATTATGTTGGTTTGGAATAAGAAAGACCTGCATATG

GAAAGGGTGATCAGTTATGAAGAAGGGAAAGCTTTGGCAGAATCTTGGA

ATGCAGCTTTTTTGGAATCTTCTGCTAAAGAAAATCAGACTGCTGTGGA

TGTTTTTCGAAGGATAATTTTGGAGGCAGAAAAAATGGACGGGGCAGCT

TCACAAGGCAAGTCTTCATGCTCGGTGATGTGATTCTGCTGCAAAGCCT

GAGGACACTGGGAATATATTCTACCTGAAGAAGCAAACTGCCCGTTCTC

CTTGAAGATAAACTATGCTTCTTTTTTCTTCTGTTAACCTGAAAGATAT

CATTTGGGTCAGAGCTCCCCTCCCTTCAGATTATGTTAACTCTGAGTCT

GTCCAAATGAGTTCACTTCCATTTTCAAATTTTAAGCAATCATATTTTC

AATTTATATATTGTATTTCTTAATATTATGACCAAGAATTTTATCGGCA

TTAATTTTTCAGTGTAGTTTGTTGTTTAAAATAATGTAATCATCAAAAT

-continued
GATGCATATTGTTACACTACTATTAACTAGGCTTCAGTATATCAGTGTT

TATTTCATTGTGTTAAATGTATACTTGTAAATAAAATAGCTGCAAACCT

C

Rheb genomic and cDNA clones are commercially available. For example, Rheb cDNA clones for human, mouse and rat are available from Sino Biological (USA).

The amino acid sequence of the Rheb protein is provided by the accession number UniProtKB Q15382, and is provided below (SEQ ID NO. 2):

(SEQ ID NO. 2)
MPQSKSRKIAILGYRSVGKSSLTIQFVEGQFVDSYDPTIENTFTKLITV

NGQEYHLQLVDTAGQDEYSIFPQTYSIDINGYILVYSVTSIKSFEVIKV

IHGKLLDMVGKVQIPIMLVGNKKDLHMERVISYEEGKALAESWNAAFLE

SSAKENQTAVDVFRRIILEAEKMDGAASQGKSSCSVM

Related proteins can be readily identified, for example by using the BLAST suite of algorithms.

In certain embodiments, the Rheb protein comprises an activity to increase one or more steps associated with production, processing and/or secretion of proteins in the cell. Methods for assessing production, processing and/or secretion of proteins in cells are known in the art.

In certain embodiments, the Rheb protein comprises an activity to increase secretion of proteins from the cell.

In certain embodiments, the method comprises secreting the selected protein from the cell.

In certain embodiments, the present disclosure provides a method of producing a selected protein, the method comprising:
expressing the selected protein in a cell expressing a Rheb (Ras homologue enriched in brain) protein having an activity to increase protein production in the cell; and
secreting the selected protein from the cell;
thereby producing the protein.

The term "protein" as used herein is used interchangeably with "polypeptide" and refers to polymers of amino acids of any length. The term includes proteins that are post-translationally modified through reactions that include, but are not limited to, glycosylation, acetylation, phosphorylation or protein processing. The protein can be a naturally occurring protein, a part thereof, a mutated or other modified form of a protein, a non-naturally occurring protein, a synthetic protein, a codon usage modified form, a fusion, and/or a deletion. Other types of proteins are contemplated.

In certain embodiments, the protein is a functional part of a protein.

In certain embodiments, the Rheb protein comprises a protein derived from the same or a similar species as the cell in which a selected protein is expressed. In certain embodiments, the Rheb protein comprises a protein derived from a different species as the cell in which a selected protein is expressed. Methods for identifying Rheb proteins from different species are known in the art, for example by using the BLAST suite of algorithms.

In certain embodiments, the Rheb protein is a naturally occurring Rheb protein or a part thereof. In certain embodiments, the Rheb protein comprises an engineered form of the protein or a part thereof.

In certain embodiments, the Rheb protein is a functional part or fragment of a Rheb protein. Methods for determining whether a part of fragment of a Rheb protein is functional are as described herein. In certain embodiments, the Rheb protein is a mutated form of a Rheb protein or a part thereof.

In certain embodiments, the Rheb protein is a human protein. In certain embodiments, the Rheb protein is a non-human Rheb protein, such as a mammalian Rheb protein. In certain embodiments, the Rheb protein is a mouse Rheb protein, a chicken Rheb protein, a rat Rheb protein, a zebrafish Rheb protein, an insect Rheb protein, or a yeast Rheb protein. Rheb proteins from other species are contemplated.

In certain embodiments, the Rheb protein is an orthologue of a Rheb protein. In certain embodiments, the Rheb protein is a paralogue of a Rheb protein. In certain embodiments, the Rheb protein is a homologue of a Rheb protein.

In certain embodiments, the Rheb protein comprises Rheb Like 1 (RhebL1) protein. The protein has two isoforms in humans (UniProtKB—Q8TAI7-1 and Q8TAI7-2). The identifier for the human RhebL1 gene in the HGNC database is HGNC:21166. Orthologues, paralogues and homologues of the gene can be readily identified, for example by using the BLAST suite of algorithms. The DNA sequence corresponding to the human mRNA (isoform 1) is provided by Genbank NM-144593.1, and the DNA sequence to other splice variant (isoform 2) is provided by Genbank (NM_001303126.1).

In certain embodiments, the Rheb protein comprises a functional variant protein.

The term "variant" of a protein or a polypeptide refers to one or more of amino acid substitution variants, amino acid insertion variants, amino acid deletion variants, amino acid fusion variants, and amino acid modification variants (natural and/or synthetic, including modifications to the peptide backbone and or modifications to amino acids), and includes variants such as an isoform, a homologue, a paralogue, and an orthologue. Methods for determining the activity of a Rheb protein are described herein.

In certain embodiments, the variant comprises an amino acid substitution.

Amino acid substitutions may be non-conservative and/or conservative amino acid changes, i.e., substitutions of similarly charged or uncharged amino acids. A conservative amino acid change typically involves substitution of one of a family of amino acids which are related in their side chains. Naturally occurring amino acids are generally divided into four families acidic (e.g. aspartate, glutamate), basic (e.g. lysine, arginine, histidine), non-polar (e.g. alanine, valine, leucine, isoleucine, proline, phenylalanine, methionine, tryptophan), and uncharged polar (e.g. glycine, asparagine, glutamine, cysteine, serine, threonine, tyrosine) amino acids. Phenylalanine, tryptophan, and tyrosine are sometimes classified jointly as aromatic amino acids. Amino acid substitutions within families and between families are contemplated.

In certain embodiments, the variant comprises an amino acid insertion.

For example, amino acid insertion variants may comprise amino- and/or carboxy-terminal fusions and also insertions of single or two or more amino acids in a particular amino acid sequence. In the case of amino acid sequence variants having an insertion, one or more amino acid residues may be inserted into a particular site(s) in an amino acid sequence, although random insertions are contemplated.

In certain embodiments, the variant comprises an amino acid deletion Amino acid deletion variants are characterized by the removal of one or more amino acids from a particular site(s) from the sequence, and include internal and/or terminal deletions. Random deletions are also contemplated.

In certain embodiments, the variant comprises an amino acid fusion Amino acid fusion variants are characterized by the addition of one or more amino acids from to sequence, which typically are $NH_2$-terminal fusions, COOH-terminal fusions and/or internal fusions.

In certain embodiments, a variant comprises a sequence with at least 50% homology, at least 60% homology, at least 70% sequence homology, at least 80% homology, at least 85% homology, at least 90% homology, at least 95% homology, at least 96% homology, at least 97% homology, at least 98% homology or at least 99% homology to a Rheb protein. Examples of Rheb proteins are described herein.

In certain embodiments, a variant comprises a sequence with at least 50% identity, at least 60% identity, at least 70% sequence identity, at least 80% identity, at least 85% identity, at least 90% identity, at least 95% identity, at least 96% identity, at least 97% identity, at least 98% identity or at least 99% identity to a Rheb protein. Examples of Rheb proteins are described herein.

The degree of homology or identity may be for a region of at least about 10, at least 20, at least a 40, at least 60, at least 80, at least 100, at least 120, at least 140, at least 160, or at least 200 amino acids, at least 300 amino acids, at least 400 amino acids or at least 500 amino acids.

Methods for determining the extent of sequence homology and identity are known, and include for example nucleic acid and protein alignment programs, such as the BLAST suite of alignment programs.

Methods for producing variants of proteins are known in the art. For example, recombinant DNA technology may be used to produce a protein. The manipulation of DNA sequences for preparing proteins and polypeptides, including those having substitutions, insertions, deletions or fusions, is described for example in Green MR and Sambrook J, Molecular Cloning: A Laboratory Manual (4th edition), Cold Spring Harbor Laboratory Press, 2012, herein incorporated by reference.

In certain embodiments, the Rheb protein comprises a mutation that promotes mTORC1 signalling in the absence of upstream activation. Methods for assessing mTORC1 signalling are described herein. Upstream activators of mTORC1 are known in the art. In certain embodiments, the Rheb protein comprises a mutation that promotes mTORC1 signalling in the absence of upstream activation due to insensitivity to the GAP activity of the TSC complex.

In certain embodiments, the Rheb protein comprises a methionine at amino acid residue 23. In certain embodiments, the Rheb protein comprises an asparagine at amino acid residue 35. In certain embodiments, the Rheb protein comprises a lysine at amino acid residue 40. Rheb proteins with one or more combinations of the aforementioned variants are contemplated.

In certain embodiments, the Rheb protein comprises a methionine at amino acid residue 23, and/or an asparagine at amino acid residue 35, and/or a lysine at amino acid residue 40.

In certain embodiments, the Rheb protein comprises a methionine at amino acid residue 23 and/or an asparagine at amino acid residue 35. In certain embodiments, the Rheb protein comprises a methionine at amino acid residue 23 and a lysine at amino acid residue 40. In certain embodiments, the Rheb protein comprises an asparagine at amino acid residue 35 and a lysine at amino acid residue 40.

In certain embodiments, the Rheb protein comprises a methionine at amino acid residue 23, an asparagine at amino acid residue 35 and a lysine at amino acid residue 40.

The amino acid sequence of human Rheb protein with a methionine variant at residue 23 (T23M) is as follows (SEQ ID NO. 3):

(SEQ ID NO. 3)
MPQSKSRKIAILGYRSVGKSSLMIQFVEGQFVDSYDPTIENTFTKLITV

NGQEYHLQLVDTAGQDEYSIFPQTYSIDINGYILVYSVTSIKSFEVIKV

IHGKLLDMVGKVQIPIMLVGNKKDLHMERVISYEEGKALAESWNAAFLE

SSAKENQTAVDVFRRIILEAEKMDGAASQGKSSCSVM

Examples of other mutations in the Rheb protein that may be screened for their ability to increase protein production in the cell and/or to increase secretion of proteins from cells include one of the following mutations: T23G, T23P, T23A, T23V, T23L, T23I, T23F, T23Y, T23W, T23H, T23K, T23R, T23Q, T23N, T23E, T23D, and T23S. Methods for producing proteins with a specific mutation are known in the art.

The amino acid sequence of human Rheb protein with an asparagine variant at residue 35 (Y35N) is as follows (SEQ ID NO. 4):

(SEQ ID NO. 4)
MPQSKSRKIAILGYRSVGKSSLTIQFVEGQEVDSNDPTIENTETKLITV

NGQEYHLQLVDTAGQDEYSIFPQTYSIDINGYILVYSVTSIKSFEVIKV

IHGKLLDMVGKVQIPIMLVGNKKDLHMERVISYEEGKALAESWNAAFLE

SSAKENQTAVDVFRRIILEAEKMDGAASQGKSSCSVM

Examples of other mutations in the Rheb protein that may be screened for their ability to increase protein production in the cell and/or to increase secretion of proteins from cells include one of the following mutations: Y35G, Y35P, Y35A, Y35V, Y35L, Y35F, Y35W, Y35H, Y35K, Y35R, Y35Q, Y35M, Y35E, Y35D, and Y35S. Methods for producing proteins with a specific mutation are known in the art.

The amino acid sequence of human Rheb protein with a lysine variant at residue 40 (E40K) is as follows (SEQ ID NO. 4):

(SEQ ID NO. 5)
MPQSKSRKIAILGYRSVGKSSLTIQFVEGQEVDSYDPTIKNTETKLITV

NGQEYHLQLVDTAGQDEYSIFPQTYSIDINGYILVYSVTSIKSFEVIKV

IHGKLLDMVGKVQIPIMLVGNKKDLHMERVISYEEGKALAESWNAAFLE

SSAKENQTAVDVFRRIILEAEKMDGAASQGKSSCSVM

Examples of other mutations in the Rheb protein that may be screened for their ability to increase protein production in the cell and/or to increase secretion of proteins from cells include one of the following mutations: E40G, E40P, E40A, E40V, E40L, E40I, E40M, E40F, E40Y, E40W, E40H, E40K, E40R, E40Q, E40N, E40D, E40S and E40T. Methods for producing proteins with a specific mutation are known in the art.

Other Rheb proteins that have an activity to increase protein production in the cell may be identified by screening as described herein.

In certain embodiments, the Rheb protein confers improved growth of the cell under low serum conditions. In certain embodiments, the Rheb protein confers improved growth of the cell under conditions where the serum is present at a concentration of 0.5% or less. In certain embodiments, the Rheb protein confers serum-independent growth on the cell. In certain embodiments, the Rheb protein comprises a methionine at amino acid residue 23.

Methods for culturing cells under low serum conditions and assessing their growth are known in the art.

Examples of other mutations in the Rheb protein that may be screened for their ability to confer growth of the cell under low serum conditions include one of the following mutations: T23G, T23P, T23A, T23V, T23L, T23I, T23F, T23Y, T23W, T23H, T23K, T23R, T23Q, T23N, T23E, T23D, and T23S.

Other Rheb proteins that have an activity to confer enhanced growth of cells under low serum growth conditions may be identified by screening as described herein.

Examples of selected proteins for expression include endogenous proteins, exogenous proteins, natural proteins, synthetic proteins, fusion proteins, proteins having a deletion, protein having an insertion, proteins have one or more amino acid substitutions, chimeric proteins, and recombinant proteins. For example, the selected protein may be an antibody, one or more light chains and one or more heavy chains of an antibody (and/or a part thereof), a monoclonal antibody, a hormone (e.g. insulin), a growth factor (e.g. growth hormone), an antibody (or part thereof), an enzyme (e.g. asparaginase), a cytokine, or a coagulation factor, a receptor, a ligand, a substrate, a protein for crystallographic studies, a protein for structural determinations, a protein for use in research, an antigenic protein. Other types of proteins are contemplated. Methods for expressing such proteins in cells, for example using recombinant DNA technology are known in the art, for example as described in "Protein Expression Technologies" 2004, edited by Francois Baneyx, Horizon Bioscience, United Kingdom. Methods for purifying proteins expressed in cells are known in the art, for example as described in "Guide to Protein Purification, Volume 463 of Methods in Enzymology", 2009 Editors R. Burgess and M Deutscher; Academic Press.

In certain embodiments, the selected protein is a secreted protein. Methods for purifying secreted proteins are known in the art, for example as described in "Guide to Protein Purification, Volume 463 of Methods in Enzymology", 2009 Editors R. Burgess and M Deutscher; Academic Press.

In certain embodiments, the selected protein is a naturally secreted protein. In certain embodiments, the selected protein is a protein engineered to be secreted. In certain embodiments, the selected protein comprises a secretion signal sequence, such as an ER signal sequence. In certain embodiments, the selected protein comprises an exogenous secretion signal sequence. Signal sequences are described, for example, in Stern et al. (2007) *Trends in Cell & Molecular Biology* 2: 1-17.

In certain embodiments, the method further comprises secreting the selected protein from the cell.

In certain embodiments, the present disclosure provides a method of producing a selected protein, the method comprising:
 expressing the selected protein in a cell expressing a Rheb (Ras homologue enriched in brain) protein having an activity to increase protein production in the cell; and
 secreting the selected protein from the cell;
 thereby producing the protein.

Examples of selected proteins are as described herein. In certain embodiments, the selected protein is an antibody, or a part thereof. In certain embodiments the selected protein is a monoclonal antibody, or a part thereof. Methods for producing antibodies, or a part thereof, are described for example in "Antibody Expression and Production" 2011, ed. Mohamed Al-Rubeai, Springer Sciences & Business Media.

In certain embodiments, the selected protein is a therapeutic protein. In certain embodiments, the selected protein is a diagnostic protein. In certain embodiments, the selected protein is an enzyme.

In certain embodiments, the method is used to produce an antibody, a part of an antibody. Methods for producing antibodies, or parts thereof, by expressing them in cells are known in the art. Methods for producing antibodies in cells are described, for example, in Li et al. (2010) *mAbs* 2(5); 466-477. Methods for purifying antibodies from antibody producing cells are described, for example, in Chiverton et al. (2016) *Biotechnology Journal* 11: 1014-1024.

In certain embodiments, the method is used to produce a therapeutic protein.

The suitability of cells for expression and/or secretion may be determined. Examples of cells for producing the selected protein include CHO cells (e.g. DUXB11, DG44, CHOK1 lines such as CHOK1-SV, Potelligent, CHO GS-KO, CHO S, CHOZN), BHK, MCF7H9, HepG2, NIH3T3, VERO, SP2/0, NS0, COST, NS0 murine myeloma cells, PER.C6 cells, HeLa cells, HEK293cells, HT-1080 cells, HKB-11 cells, CAP cells, MOR103 cells, Cv-1, COS-1, and HuH-7 cells. Other types of cells are contemplated.

In certain embodiments, the cell for producing the selected protein is an adherent cell.

In certain embodiments, the cell is a CHO cell. For example, production of proteins in CHO cells is as described in "Heterologous Protein Production in CHO Cells: Methods and Protocols" 2017. Editor Paula Meleady, Springer New York.

In certain embodiments, the cell for producing the selected protein is a non-adherent cell.

In certain embodiments, the cell is a mammalian cell, such as a human cell or a murine cell.

In certain embodiments, the cell is an insect cell. In certain embodiments, the cell is a yeast cell. Other types of suitable cells may be selected.

In certain embodiments, the present disclosure provides a method of producing a selected protein, the method comprising expressing the selected protein in a cell expressing a Rheb protein having an activity to increase protein production in the cell, and thereby produced the selected protein.

Methods for determining whether a Rheb protein has an activity to increase protein production in a cell are known in the art.

In certain embodiments, the cell comprises an endogenous Rheb protein having an activity to increase protein production in the cell. In certain embodiments, the cell comprises an endogenous Rheb protein mutated or engineered to express a Rheb protein having an activity to increase protein production in a cell. Mutations in Rheb are as described herein.

In certain embodiments, the Rheb protein comprises a methionine at amino acid residue 23, and/or an asparagine at amino acid residue 35. Other variants are described herein.

In certain embodiments, the cell comprises an endogenous gene encoding a Rheb protein having an activity to increase protein production in the cell. In certain embodiments, an endogenous gene is altered to encode a Rheb protein which increases protein production in the cell. Methods for altering endogenous genes are known in the art, such as the use of CRISPR-Cas9.

In certain embodiments, the cell comprises an exogenous Rheb protein having an activity to increase protein production in the cell. Methods for introducing exogenous proteins into cells are known in the art, for example by introducing a nucleic acid encoding a protein into a cell (see for example Green M R and Sambrook J, Molecular Cloning: A Laboratory Manual (4th edition), Cold Spring Harbor Laboratory Press, 2012; Ausubel et al., Current Protocols in Molecular Biology (2011), John Wiley & Sons, Inc.) or by direct introduction of proteins into cells. Introduction of proteins directly into cells may be performed by a method known in the art, for example, as described in Weill et al. (2008) *Cytotechnology* 56(1): 41 to 48.

In certain embodiments, the cell comprises an exogenous gene encoding a Rheb protein having an activity to increase protein production in the cell. Rheb proteins having an activity to increase protein production in a cell are as described herein.

In certain embodiments, the endogenous gene encodes a Rheb protein comprising a mutation that promotes mTORC1 signalling in the absence of upstream activation.

In certain embodiments, the exogenous gene encodes a Rheb protein comprising a methionine at amino acid residue 23, and/or an asparagine residue at amino acid residue 35, and/or a lysine at amino acid residue 40. Other mutations in the Rheb protein or variants are as described herein. Methods for introducing mutations into nucleic acids are known in the art, for example by way of directed mutagenesis or random mutagenesis.

Methods for introducing exogenous genes into cells are known in the art.

In certain embodiments, the cell comprises one or more nucleic acids introduced into the cell encoding a Rheb protein, or a functional part thereof. Methods for expressing proteins, including the selection of an appropriate promoter and other DNA/RNA elements, from introduced nucleic acids are known in the art.

Methods for introducing nucleic acids into cells are known in the art, for example as described in Green M R and Sambrook J, Molecular Cloning: A Laboratory Manual (4th edition), Cold Spring Harbor Laboratory Press, 2012 (herein incorporated by reference) and Ausubel et al., Current Protocols in Molecular Biology (2011), John Wiley & Sons, Inc. (herein incorporated by reference).

Examples for introducing nucleic acids into cells include transformation, injection, viral infection, or bombardment with DNA-coated tungsten particles. Other methods for introducing nucleic cells are contemplated.

In certain embodiments, the Rheb protein (or a functional part thereof) is expressed in a cell from a vector.

In certain embodiments, the selected protein is expressed in a cell from a vector.

Suitable vectors are known in the art.

The term "vector" refers to a nucleic acid that can be used to introduce another nucleic acid linked to it into a cell, and which are typically used to express a desired protein or produce a desired RNA. One type of vector is a "plasmid", which refers to a linear or circular double stranded DNA molecule into which additional nucleic acid segments can be ligated. Another type of vector is a viral vector (e.g., replication defective retroviruses, adenoviruses and adeno-associated viruses), wherein additional DNA segments can be introduced into the viral genome. Certain vectors are capable of autonomous replication in a host cell into which they are introduced (e.g. episomal mammalian vectors). Other vectors (e.g., non-episomal mammalian vectors) integrate into the genome of a host cell upon introduction into the host cell and culturing under selective pressure, and thereby are replicated along with the host genome.

Typically, the vector comprises a nucleic acid encoding the protein of interest, sequences controlling the expression of the nucleic acid and a selectable marker gene. For example, a vector may comprises a promoter sequence, a region for insertion of a nucleic acid encoding a protein of interest, a 3' untranslated region, typically containing a polyadenylation site, and a selectable marker.

Examples of vectors include plasmid based expression vectors, adenoviral vectors, vaccinia vectors, retroviral vectors, and baculovirus vectors. Other types of vectors are contemplated.

In certain embodiments, the vector is used to direct the expression of a Rheb protein (or a functional part thereof).

In certain embodiments, the vector is used to direct the expression of a selected protein.

In certain embodiments, the vector is used to direct expression of both a Rheb protein and a selected protein. In this case, one of the proteins may be expressed for example from an internal ribosome entry site.

Methods for cloning DNAs encoding a protein into a vector are known in the art, for example as described in Green M R and Sambrook J, Molecular Cloning: A Laboratory Manual (4th edition), Cold Spring Harbor Laboratory Press, 2012 (herein incorporated by reference).

In certain embodiments, the vector comprises a nucleic acid encoding a Rheb protein (or a functional part thereof) comprising a methionine at amino acid residue 23, and/or an asparagine residue at amino acid residue 35, and/or a lysine at amino acid residue 40. Other mutations or variants are as described herein.

In certain embodiments, the Rheb protein is expressed in the cell by introduction of a Rheb protein directly into the cell. Methods for introducing proteins into cells are known in the art, and include permeabilisation, microinjection, or electroporation. Methods for producing proteins are known in the art, including by recombinant DNA technology or chemical synthesis.

In certain embodiments, a nucleic acid is introduced into a cell by way of transformation, transfection or infection.

The term "transformation" and "transfection" and variants thereof as used herein refers to the introduction of genetic material into a host cell, wherein the host cell may be transiently transfected or stably transfected. The genetic material may be an expression vector comprising a gene of interest (e.g., a recombinant secreted therapeutic protein) or a polynucleotide sequence encoding a RNA.

For introduction of a viral nucleic acid, the nucleic acid may be introduced into a cell as a naked nucleic acid sequence or may be packaged in a viral protein envelope.

Transformation/transfection of eukaryotic host cells with a polynucleotide or expression vector, resulting in genetically modified cells or transgenic cells, can be performed by a method known in the art (for example as described in Green M R and Sambrook J, Molecular Cloning: A Laboratory Manual (4th edition), Cold Spring Harbor Laboratory Press, 2012). Methods include, for example, liposome-mediated transfection, calcium phosphate co-precipitation, electroporation, nucleofection, nucleoporation, microporation, polycation (such as DEAE-dextran)-mediated transfection, protoplast fusion, viral infections and microinjection. Transformation may result in a transient or stable transformation of the host cells. For stable transfectants, the constructs are either integrated into the host cell's genome or an artificial chromosome/mini-chromosome or located episomally so as to be stably maintained within the host cell. Typically, this involves the use of a selectable marker gene and the gene of interest is maintained together with the selectable marker gene. In some cases the entire expression vector integrates into the cell's genome, in other cases only parts of the expression vector integrate into the cell's genome.

In certain embodiments, the protein is isolated from the cell. In certain embodiments, the method comprises isolating the protein from the cell.

The term "isolated" or the related term "isolating" refers to a process whereby a species, such as a complex, a cell, a nucleic acid or a protein, has been separated (partially or completely) from its natural or original environment.

In certain embodiments, a secreted protein is harvested from medium. In certain embodiments, the selected protein is a secreted protein and the method comprises harvesting the protein from the cell medium.

In certain embodiments, the protein (selected protein) is partially purified. In certain embodiments, the protein is substantially purified.

In certain embodiments, the protein has at least 95%, at least 96%, at least 97%, at least 98%, or at least 99% purity. In certain embodiments, the method comprises purifying the protein from the cell. In certain embodiments, the method comprises purifying the protein to at least 95%, at least 96%, at least 97%, at least 98%, or at least 99% purity. In certain embodiments, the method comprises substantially purifying the protein from the cell.

Methods for isolating and purifying proteins are known in the art.

In certain embodiments, the present disclosure provides a method of producing a secreted protein, the method comprising:
  expressing the protein to be secreted in a cell expressing a Rheb protein having an activity to increase protein production from the cell and secreting the protein from the cell;
  thereby producing the secreted protein.

In certain embodiments, the Rheb protein comprises a mutation that promotes mTORC1 signalling in the absence of upstream activation. Mutations in Rheb are as described herein.

In certain embodiments, the present disclosure provides a method of producing a secreted protein, the method comprising:
  expressing the protein to be secreted in a cell expressing a Rheb protein comprising a methionine at amino acid residue 23, and/or an asparagine at amino acid residue 35, and/or a lysine at amino acid residue 40 of the protein, and secreting the protein from the cell;
  thereby producing the secreted protein.

Certain embodiments of the present disclosure provide a protein produced by a method as described herein.

Examples of proteins for production are as described herein. In certain embodiments, the protein comprises an antibody and/or a part thereof. In certain embodiments, the protein comprises a therapeutic protein.

In certain embodiments, the protein is isolated from the cell.

In certain embodiments, the protein is secreted and the protein is harvested from the cell medium.

In certain embodiments, the protein is partially purified. In certain embodiments, the protein is substantially purified. In certain embodiments, the protein has at least 95%, at least 96%, at least 97%, at least 98%, or at least 99% purity.

Certain embodiments of the present disclosure provide a method of improving expression of a protein.

In certain embodiments, the present disclosure provides a method of improving expression of a selected protein, the method comprising expressing the selected protein in a cell expressing a Rheb protein having an activity to increase protein production in the cell, and thereby improving expression of the selected protein.

In certain embodiments, the Rheb protein comprises a mutation that promotes mTORC1 signalling in the absence of upstream activation.

Rheb proteins having an activity to increase protein production in the cell are as described herein.

Methods for expressing proteins are as described herein. Rheb proteins, and cells expressing Rheb proteins, are as described herein.

In certain embodiments, the method comprises improving the expression of the protein by at least 1.2 fold. Methods for determining the extent of expression of a protein are known in the art.

Certain embodiments of the present disclosure provide a method of improving secretion of a secretable protein.

Methods for determining the extent of secretion of a protein are known in the art.

In certain embodiments, the present disclosure provide a method of improving secretion of a secretable protein, the method comprising expressing the secretable protein in a cell expressing a Rheb protein having an activity to increase protein secretion from a cell, thereby improving secretion of the secretable protein.

Methods for expressing proteins are as described herein. Rheb proteins, and cells expressing Rheb proteins, are as described herein.

In certain embodiments, the method comprises improving the secretion of the protein by at least 2 fold, or at least 3 fold. Methods for determining the extent of secretion of a protein are known in the art.

In certain embodiments, the Rheb protein comprises a mutation that promotes mTORC1 signalling in the absence of upstream activation.

In certain embodiments, the present disclosure provides a method of improving secretion of a secretable protein, the method comprising expressing the secretable protein in a cell expressing a Rheb protein comprising a methionine at amino acid residue 23, and/or an asparagine at amino acid residue 35, and/or a lysine at amino acid residue 40 of the protein, thereby improving secretion of the secretable protein from the cell.

In certain embodiments, the present disclosure provides a method of improving secretion of proteins by a cell, the method comprising expressing in the cell a Rheb protein having an activity to increase protein secretion in the cell, thereby improving secretion of proteins by the cell.

In certain embodiments, the Rheb protein comprises a mutation that promotes mTORC1 signalling in the absence of upstream activation.

In certain embodiments, the present disclosure provides a method of improving secretion of proteins by a cell, the method comprising expressing in the cell a Rheb protein comprising a methionine at amino acid residue 23, and/or an asparagine at amino acid residue 35, and/or a lysine at amino acid residue 40 of the protein, thereby improving secretion of proteins by the cell.

In certain embodiments, the Rheb protein comprises a methionine at amino acid residue 23, and/or an asparagine at amino acid residue 35, and/or a lysine at amino acid residue 40.

In certain embodiments, the Rheb protein comprises a methionine at amino acid residue 23 and/or an asparagine at amino acid residue 35. In certain embodiments, the Rheb protein comprises a methionine at amino acid residue 23 and a lysine at amino acid residue 40. In certain embodiments, the Rheb protein comprises an asparagine at amino acid residue 35 and a lysine at amino acid residue 40.

In certain embodiments, the Rheb protein comprises a methionine at amino acid residue 23, an asparagine at amino acid residue 35 and a lysine at amino acid residue 40.

Certain embodiments of the present disclosure provide a method of producing a cell with improved expression of proteins.

In certain embodiments, the present disclosure provides a method of producing a cell with improved expression of proteins, the method comprising expressing in the cell a Rheb protein having an activity to increase protein secretion in the cell, thereby producing a cell with improved expression of proteins.

Methods for producing a cell expressing a Rheb variant are as described herein.

In certain embodiments, the Rheb protein comprises a mutation that promotes mTORC1 signalling in the absence of upstream activation.

In certain embodiments, the present disclosure provides a method of producing a cell with improved expression of proteins, the method comprising expressing in the cell a Rheb protein comprising a methionine at amino acid residue 23, and/or an asparagine at amino acid residue 35, and/or a lysine at amino acid residue 40 of the protein, thereby producing a cell with improved expression of proteins.

Improvements in the expression of proteins are as described herein.

Certain embodiments of the present disclosure provide a cell with improved protein improved expression produced by a method as described herein.

Certain embodiments of the present disclosure provide a method of producing a cell with improved secretion.

In certain embodiments, the present disclosure provides a method of producing a cell with improved secretion of proteins, the method comprising expressing in the cell a Rheb protein having an activity to increase protein secretion in the cell, thereby producing a cell with improved secretion of proteins.

In certain embodiments, the Rheb protein comprises a mutation that promotes mTORC1 signalling in the absence of upstream activation.

In certain embodiments, the present disclosure provides a method of producing a cell with improved secretion of proteins, the method comprising expressing in the cell a Rheb protein comprising a methionine at amino acid residue 23, and/or an asparagine at amino acid residue 35, and/or a lysine at amino acid residue 40 of the protein, thereby producing a cell with improved secretion of proteins.

In certain embodiments, the present disclosure provides a method of producing a cell with improved secretion of proteins, the method comprising introducing a mutation into a Rheb nucleic acid to express a Rheb protein to increase protein secretion in the cell, thereby producing a cell with improved secretion of proteins.

In certain embodiments, the mutation comprises a mutation that promotes mTORC1 signalling in the absence of upstream activation.

In certain embodiments, the mutation comprises a methionine at amino acid residue 23, and/or an asparagine at amino acid residue 35, and/or a lysine at amino acid residue 40 of the protein, Certain embodiments of the present disclosure provide a cell with improved secretion of proteins produced by a method as described herein.

Examples of cells are as described herein.

Certain embodiments of the present disclosure provide a method of conferring serum independent growth on a cell.

In certain embodiments, the present disclosure provides a method of conferring serum-independent growth on a cell, the method comprising expressing in the cell a Rheb protein comprising a methionine at amino acid residue 23 of the protein and thereby conferring serum-independent growth on the cell.

Serum independent growth is as described herein.

In certain embodiments, the Rheb protein confers improved growth of the cell under low serum conditions. In certain embodiments, the Rheb protein confers improved growth of the cell under conditions where the serum is present at a concentration of 0.5% or less. In certain embodiments, the Rheb protein confers serum-independent growth on the cell. Methods for culturing cells under low serum conditions and assessing their growth are known in the art.

Methods for assessing and growing cells under low serum conditions are known in the art.

In certain embodiments, the present disclosure provides a method of producing a cell comprising a characteristic of improved serum-independent growth, the method comprising expressing in the cell a Rheb protein comprising a methionine at amino acid residue 23 of the protein and thereby improving serum-independent growth of the cell.

In certain embodiments, the present disclosure provides a method of producing a cell comprising a characteristic of improved serum-independent growth, the method comprising introducing a mutation into a Rheb nucleic acid to express a Rheb protein comprising a methionine at amino acid residue 23 in the cell, thereby producing a cell with improved serum-independent growth.

Certain embodiments of the present disclosure provide a cell with serum-independent growth produced by a method as described herein.

Certain embodiments of the present disclosure provide a cell with serum independent growth, the cell comprising a Rheb protein comprising a methionine at amino acid residue 23.

Certain embodiments of the present disclosure provide a cell comprising a nucleic acid encoding a Rheb protein having an activity to increase production of proteins in the cell.

In certain embodiments, the present disclosure provides a cell comprising a recombinant nucleic acid encoding a Rheb protein having an activity to increase production of proteins in the cell.

Rheb proteins, and nucleic acids encoding Rheb proteins, are as described herein.

In certain embodiments, the nucleic acid encodes a Rheb protein comprising a mutation that promotes mTORC1 signalling in the absence of upstream activation.

In certain embodiments, the nucleic acid encodes a Rheb comprising a methionine at amino acid residue 23, and/or an asparagine at amino acid residue 35, and/or a lysine at amino acid residue 40 of the protein.

Recombinant nucleic acids, and methods for producing and introducing such nucleic acids, are as described herein.

In certain embodiments, the present disclosure provides a cell comprising a recombinant nucleic acid for introducing a mutation into a nucleic acid encoding a Rheb protein to increase production of proteins in the cell.

In certain embodiments, the present disclosure provides a cell expressing a recombinant Rheb protein having an activity to increase production of proteins in the cell.

In certain embodiments, the present disclosure provides a cell genetically engineered to introduce a mutation into a Rheb nucleic acid which improves production of proteins in the cell.

Certain embodiments of the present disclosure provide a cell comprising a nucleic acid encoding an altered Rheb protein having an activity to increase production of proteins in the cell.

Certain embodiments of the present disclosure provide a cell comprising a nucleic acid encoding a Rheb protein having an activity to increase secretion of proteins from the cell.

In certain embodiments, the present disclosure provides a cell comprising a recombinant nucleic acid encoding a Rheb protein having an activity to increase secretion of proteins from the cell.

Rheb proteins, and nucleic acids encoding Rheb proteins, are as described herein.

In certain embodiments, the nucleic acid encodes a Rheb protein comprising a mutation that promotes mTORC1 signalling in the absence of upstream activation.

In certain embodiments, the nucleic acid encodes a Rheb comprising a methionine at amino acid residue 23, and/or an asparagine at amino acid residue 35, and/or a lysine at amino acid residue 40 of the protein.

Recombinant nucleic acids, and methods for producing and introducing such nucleic acids, are as described herein.

In certain embodiments, the present disclosure provides a cell comprising a recombinant nucleic acid for introducing a mutation into a nucleic acid encoding a Rheb protein to increase secretion of proteins from the cell.

In certain embodiments, the present disclosure provides a cell expressing a recombinant Rheb protein having an activity to increase secretion of proteins from the cell.

In certain embodiments, the present disclosure provides a cell genetically engineered to introduce a mutation into a Rheb nucleic acid which improves secretion of proteins in the cell.

Certain embodiments of the present disclosure provide a cell comprising a nucleic acid encoding an altered Rheb protein having an activity to increase secretion of proteins in the cell.

Certain embodiments of the present disclosure provide a non-naturally occurring cell comprising a Rheb protein comprising a methionine at amino acid residue 23, and/or an asparagine at amino acid residue 35, and/or a lysine at amino acid residue 40 of the protein.

Certain embodiments of the present disclosure provide a cell engineered to express a Rheb protein comprising a methionine at amino acid residue 23, and/or an asparagine at amino acid residue 35, and/or a lysine at amino acid residue 40 of the protein.

Certain embodiments of the present disclosure provide nucleic acids encoding a Rheb protein.

In certain embodiments, the present disclosure provides a recombinant vector comprising a nucleic acid encoding a Rheb protein which improves production of proteins in a cell.

Rheb proteins, and nucleic acids encoding Rheb proteins, are as described herein.

In certain embodiments, the nucleic acid encodes a Rheb protein comprising a mutation that promotes mTORC1 signalling in the absence of upstream activation.

In certain embodiments, the nucleic acid encodes a Rheb comprising a methionine at amino acid residue 23, and/or an asparagine at amino acid residue 35, and/or a lysine at amino acid residue 40 of the protein.

Certain embodiments of the present disclosure provide an animal comprising one or more cells engineered to express a Rheb protein having an activity to increase protein production in the one or more cells.

Certain embodiments of the present disclosure provide an animal comprising one or more cells engineered to express a Rheb protein having an activity to increase protein secretion from the one or more cells.

Methods for producing transgenic or genetically modified animals are known in the art.

In certain embodiments, the one or more cells express a Rheb protein comprising a mutation that promotes mTORC1 signalling in the absence of upstream activation.

In certain embodiments, the one or more cells express a Rheb protein comprising a methionine at amino acid residue 23 and/or an asparagine at amino acid residue 35, and/or a lysine at amino acid residue 40 of the protein.

Certain embodiments of the present disclosure provide a guide RNA comprising one or more nucleotides for introducing a mutation into a Rheb nucleic acid to produce a Rheb protein that increases production of proteins in a cell.

Certain embodiments of the present disclosure provide a guide RNA comprising one or more nucleotides for introducing a mutation into a Rheb nucleic acid to produce a Rheb protein that increases secretion of proteins from a cell.

Guide RNAs for use in methodologies involving CRISPR-Cas9 are known in the art. Methods for producing a guide RNA for introducing a mutation into a Rheb gene are known in the art.

Certain embodiments of the present disclosure provide a method of introducing a mutation into a cell, the method comprising using a guide RNA as described herein to introduce the mutation into the cell.

Certain embodiments of the present disclosure provide a cell comprising a guide RNA as described herein.

Certain embodiments of the present disclosure provide a system for producing a protein.

Certain embodiments of the present disclosure provide a system for producing a protein, the system comprising a bioreactor comprising cells expressing a Rheb protein having an activity to increase production of proteins in the cells.

Cells expressing a Rheb protein having an activity to increase production or secretion are as described herein.

Certain embodiments of the present disclosure provide a system for producing a protein, the system comprising a bioreactor comprising cells as described herein. Other components of the system, for example to support the functioning of the system and/or to support processing of produced proteins, are contemplated.

Systems and methods for producing proteins in bioreactors are known in the art. Methods for producing proteins in bioreactors are as described for example in Thompson et al. (2016) *Methods Mol. Biol.* 1350: 241-61, and for antibodies in Li et al. (2010) *MAbs* 2(5): 466-477.

Certain embodiments of the present disclosure provide a method for screening or identifying mutations in a Rheb protein to improve expression of proteins, to improve secretion of proteins, and/or to confer serum-independent growth on cells. Methods for identifying proteins or mutations with the desired characteristics are as described herein, and may include use of cells in vitro or in an animal model.

Certain embodiments of the present disclosure provide a method of identifying or screening for a mutation in a Rheb protein to improve expression of proteins in cells.

In certain embodiments, the present disclosure provides a method of identifying a mutation in a Rheb protein to improve expression of proteins, the method comprising:
expressing in a cell a Rheb protein with a candidate mutation; and
identifying the candidate mutation as a mutation in the Rheb protein to improve expression of proteins.

In certain embodiments, the method comprises screening for a mutation that promotes mTORC1 signalling in the absence of upstream activation.

Certain embodiments of the present disclosure provide a method of identifying or screening for a mutation in a Rheb protein to improve secretion of protein from cells.

In certain embodiments, the present disclosure provides a method of identifying a mutation in a Rheb protein to improve secretion of proteins, the method comprising:
expressing in a cell a Rheb protein with a candidate mutation; and
identifying the candidate mutation as a mutation in the Rheb protein to improve secretion of proteins.

In certain embodiments, the method comprises screening for a mutation that promotes mTORC1 signalling in the absence of upstream activation.

Certain embodiments of the present disclosure provide a method of identifying or screening for a mutation in a Rheb protein to confer serum independent growth on cells.

In certain embodiments, the present disclosure provides a method of identifying a mutation in a Rheb protein to confer serum-independent growth on a cell, the method comprising:
expressing in a cell a Rheb protein with a candidate mutation; and
identifying the candidate mutation as a mutation in the Rheb protein to confer serum-independent growth on the cell.

Standard techniques and equipment may be used for recombinant DNA technology, DNA sequencing, DNA arrays, oligonucleotide synthesis, molecular biology, cell biology and enzymatic reactions. The foregoing techniques and procedures may be generally performed according to methods known in the art and/or as commercially available, and are as described for example in Sambrook et al. Molecular Cloning: A Laboratory Manual (4th ed., Cold Spring Harbor Laboratory Press, Cold Spring Harbor, N.Y. (1989)) and Ausubel et al Current Protocols in Molecular Biology (2003) John Wiley & Sons, both of which are herein incorporated by reference.

The present disclosure is further described by the following examples. It is to be understood that the following description is for the purpose of describing particular embodiments only and is not intended to be limiting with respect to the above description.

Example 1—Rheb Mutants S21L, T23M, G29S and Y35N Promote mTORC1 Signalling in the Absence of Upstream Activation Due to Insensitivity to the GAP Activity of the TSC Complex Materials and Methods The cDNA encoding human Rheb was purchased from the American Type Culture Collection (accession number B1599937) and was subcloned into the BamHI and EcoRI sites of pRK7, giving it an N-terminal FLAG tag. The GST-Rheb construct was made by PCR cloning of the human Rheb cDNA in frame into the BamHI and EcoRI sites of pGEX-4T2. All Rheb mutants were created by site-directed mutagenesis using the vector encoding GST-tagged wild-type Rheb as template. For mutagenesis, Promega's pfu DNA polymerase (Cat. No. M7741) was employed. The primers used for mutagenesis were:

RHEB_T23M_FORWARD
(SEQ ID NO: 6)
5'-GCCTTCAACAAATTGAATCATCAATGAGGATTTCCCCAC-3'

RHEB_T23M_REVERSE:
(SEQ ID NO: 7)
5'-GTGGGGAAATCCTCATTGATGATTCAATTTGTTGAAGGC-3'

RHEB_Y35N_FORWARD:
(SEQ ID NO: 8)
5'-GAAGGCCAATTTGTGGACTCCAACGATCCAACCATAGAAAAC-3'.

RHEB_Y35N_REVERSE:
(SEQ ID NO: 9)
5'-GTTTTCTATGGTTGGATCGTTGGAGTCCACAAATTGGCCTTC-3'.

RHEB_E40K_FORWARD:
(SEQ ID NO: 10)
5'-CTCCTACGATCCAACCATAAAAAACACTTTTACAAAGTTG-3'.

RHEB_E40K_REVERSE:
(SEQ ID NO: 11)
5'-CAACTTTGTAAAAGTGTTTTTTATGGTTGGATCGTAGGAG-3'.

Preparation of GST-Rheb

A 4 mL Luria Bertani starter culture was inoculated with antibiotics from −80 bacteria glycerol stock and shaken at 250 rpm at 37° C. until the OD 600 was over 1.0 (~6 hr to overnight). The entire 4 mL starter culture was then added to 200 mL of Luria Bertani culture containing antibiotics and shaken at 250 rpm at 37° C.

When the OD 600 reached 0.6-0.8 (~2 hrs), 50 µL of 1M IPTG (isopropyl β-D-1-thioplactopyranoside, Thermo Scientific-Pierce #34060) (0.25 mM final) was added. This was shaken at 250 rpm at 30° C. for an additional 6

Preparation of bacterial pellet: All steps were performed on ice/4°.

The bacteria were centrifuged at ~5000×g, for 15 min, at 4° C. The supernatant was poured off and the solution briefly drained upside down before being gently tapped out onto paper towel to remove all supernatant. The resulting material was snap frozen in LN2.

Lysis of bacterial pellet: Volumes quoted are per 5 mL resuspended pellet.

The pellet was thawed on ice for ~10 min Once thawed it was resuspended in 5 mL (per gram of pellet) of ice-cold Resuspension Buffer (50 mM HEPES, pH 7.4; 140 mM NaCl; 1 mM 0.5M EDTA; 1 mM dithiothreitol (DTT; added fresh)) and 1:100 protease inhibitor cocktail (Sigma, P8340; added fresh). The solution was transferred to 15 mL conical tube.

25 µL of lysozyme (ThermoScientific-Pierce #89833, 50 mg/mL in double-distilled $H_2O$, made fresh; mixed by flicking, not vortexing) was added for a final concentration of 0.25 mg/mL, this was rocked for 15 min at 4° C.

67 µL of 15% Triton X-100 (0.2% final) was added and this was mixed by inverting and rocking for 30 min at 4° C.

15 µL DNase I (10 U/µL stock) and 60 µL 1M $MgCl_2$ (~12 min final), was added and this was rocked for a further 30 min at 4° C.

The final solution was split evenly into 5×1.5 mL tubes, before being centrifuged at 16,000×g for 15 min at 4° C. The supernatant was transferred to 5 new 1.5 mL tubes. The lysate aliquots were snap frozen in LN2 and stored at −80° C.

Purification of GST-Rheb: GSH-agarose beads 3× in Resuspension Buffer (see above) were washed and equilibrated (DTT and PI not required) the beads were then spun down 3000×g.

100 uL of equilibrated GSH-beads (1:1 suspension in Resuspension Buffer to 1 mL aliquot of bacterial supernatant) were added and put on the rotating wheel for 1 h at 4° C.

The beads were spun down at 3000×g. The supernatant was removed without disturbing the beads.

The beads were washed for 3×10 min with 1 mL buffer (termed "Rheb Wash Buffer+EDTA"; 50 min HEPES, pH 7.4; 0.5M NaCl; 1 min EDTA; 0.2% Triton X-100; 1:100 Protease Inhibitors (add fresh) and 1 min DTT (also added fresh) and then placed on the rotating wheel at 4° C.

The beads were washed again for 2×5 min with 1 mL HEPES-buffered saline (HBS; 50 min HEPES, pH 7.4; 140 min NaCl; 2.7 min KCl; and fresh 0.1 mg/mL bovine serum albumin and protease inhibitors (1:200), both added fresh.

The bound GST-tagged proteins were eluted in 100 µL of 30 min reduced glutathione in HBS plus freshly added 0.1 mg/mL bovine serum albumin and protease inhibitors (1:200) and placed on the rotating wheel for 2 h at 4° C. The eluted protein was then dialysed overnight at 4° C. against 1 L of 20 min Tris-HCl, pH 7.5; 100 min KCl; 5% glycerol; 5 min β-mercaptoethanol. Protein samples were then aliquotted and stored at −80° C. until required.

The beads were spun down at 3000×g and the supernatant (containing the eluted proteins) was transferred to a new tube, stored on ice, dialysed against (50 min HEPES (pH 7.4), 100 mM. NaCl, 10 min $MgCl_2$, 0.1% Triton).

A) Recombinant GST-Rheb proteins were subjected to GTPase assays in the presence of FLAG-TSC1, FLAG-TSC2 and [α-$^{32}$P]GTP. Nucleotide-bound GST-Rheb was purified from the reaction mixture using 20 µl glutathione bead slurry. Radioactive GDP and GTP were separated by thin-layer chromatography and visualized by phosphorimager.

Results

The results are shown in FIG. 1.

FIGS. 1A and 1B show that TSC1/TSC2 were completely unable to promote hydrolysis of GTP bound to the S21L, T23M, Y35N, E40K and G63A mutants, while partial resistance to them was seen for Rheb mutants G29S and Q64L.

FIGS. 1C and 1D show that CHO cells over expressing IT main mTORC1 signalling in the absence of upstream activators; however, signalling was removed when co-transfected with TSC1/TSC2. Rheb-S21L, T23M, G29S, Y35N and E40K showed increased mTORC1 signalling over both the empty vector and Rheb-WT in the absence of upstream activation and showed no reduction when co-transfected with TSC1/TSC2.

Conclusions

The Rheb mutants S21L, T23M, G29S, Y35N and E40K promote mTORC1 signalling in the absence of upstream activation due to insensitivity to the GAP activity of the TSC complex.

Example 2—Rheb-T23M and Y35N Cause Constitutive Activation of mTORC1

Materials and Methods

CHO cells were seeded into chamber slides at a density of 50,000 cells/slide 24 h prior to transfection via Lipofectamine3000 with an empty pcDNA3.1 vector or Rheb-WT, T23M, Y35N or E40K. 24 h after transfection cells were transferred to medium lacking FBS for 16 h. Cells were fixed with 4% paraformaldehyde, permeabilized with 0.05% Triton X-100, blocked with 10% normal donkey serum before LAMP1 and mTOR antibodies were applied overnight. Alexa Fluor™ 488 and 594 secondary antibodies were applied before cells were mounted and stained with DAPI.

Results

Figure 2:
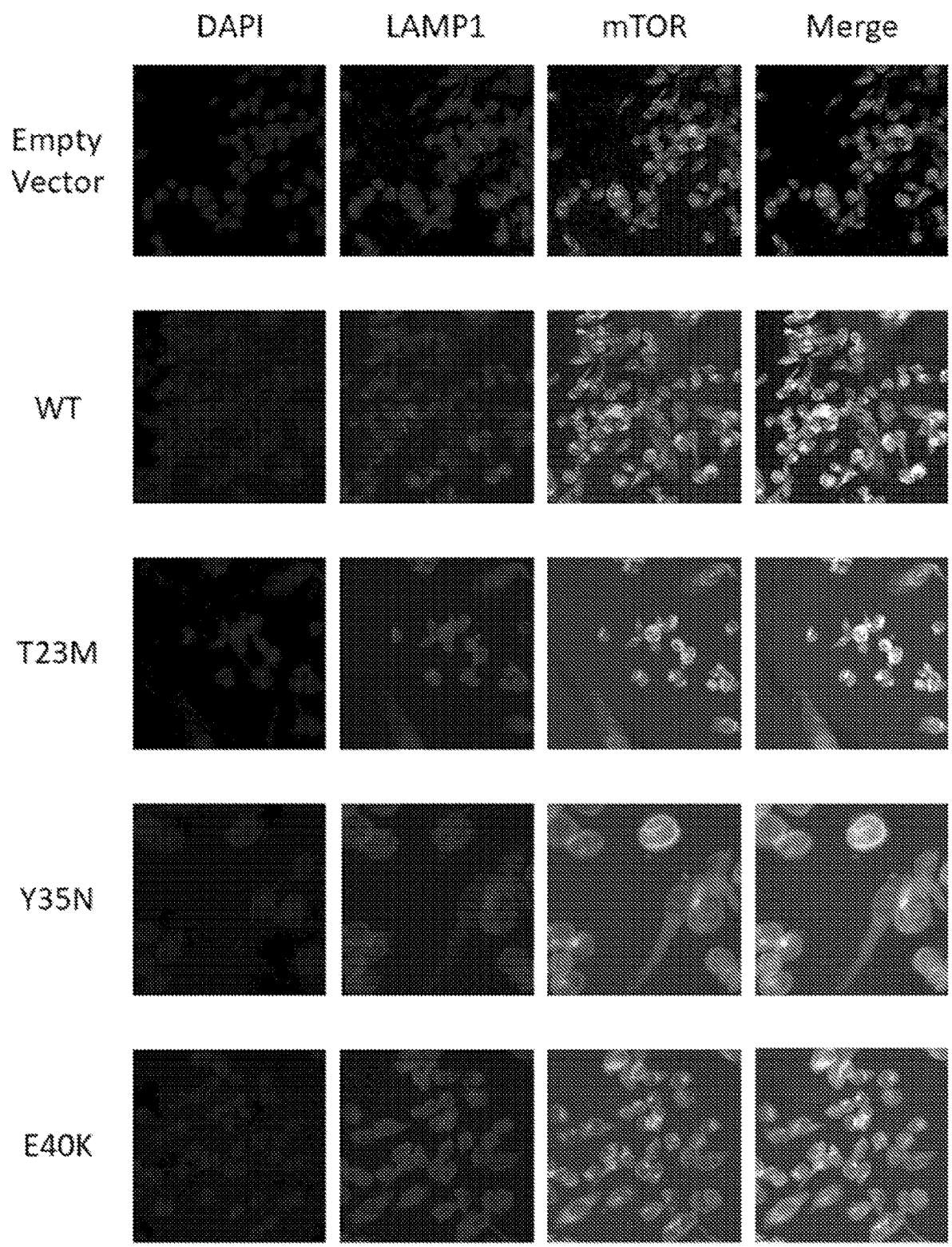
FIG. 2 shows that in cells expressing Rheb-T23M, Y35N or E40K mTORC1 localisation at the lysosome is maintained under conditions of serum starvation thereby supporting active mTORC1 signalling. CHO-K1 cells were seeded in chamber slides at a density of 50,000 cells/slide 24 h prior to transfection via Lipofectamine3000 with an empty vector or vector for Rheb-WT, T23M, Y35N or E40K. 24 h after transfection cells were transferred to medium lacking FBS for 16 hours. Cells were fixed with 4% paraformaldehyde, permeabilized with 0.05% Triton X-100, blocked with 10% normal donkey serum before LAMP1 and then anti-mTOR antibodies were applied overnight. Alexa Fluor™ 488 and 594-labelled secondary antibodies were applied before cells were mounted and stained with DAPI. The cells transfected with the empty vector and Rheb-WT showed strong expression of both mTOR and LAMP1; however, when the images are merged there is little observed overlap of the signals, as seen by the lack of yellow, indicating that mTOR is not colocalising to the lysosome with the lysosomal marker LAMP1. In contrast, cells expressing Rheb-T23M and Y35N show strong mTOR localisation on lysosomes. Whereas under normal conditions mTORC1 is localised to the lysosome where it is activated, this does not occur when serum starvation removes upstream activators of mTORC1. However, in cells expressing Rheb-T23M, Y35N or E40K mTORC1 localisation at the lysosome is maintained under conditions of serum starvation thereby supporting active mTORC1 signalling.

The results are shown in FIG. 2.

The cells expressing the empty vector and Rheb-WT showed strong expression of both mTOR and LAMP1; however, when merged there is little overlap of the proteins indicating little localisation. In contrast, cells expressing Rheb-T23M, Y35N and E40K promote localisation as indicated by the merged image.

Conclusion

Under conditions where serum is present, mTORC1 is localised to the lysosome where it is activated. This does not occur when serum starvation removes upstream activators of mTORC1. Rheb-T23M, Y35N and E40K maintain mTORC1 activity during serum starvation and thus maintain mTORC1 localisation at the lysosome, demonstrating that they cause constitutive activation of mTORC1.

Example 3—Overexpressing Rheb-T23M in CHO Cells Allows the Cells to Grow Efficiently in Serum-Free Medium Materials and Methods CHO cells were seeded into 24-well plates at 5,000 cells/well. 24 h after seeding, cells were transfected using Lipofectamine3000 with an empty pcDNA3.1 vector or vectors for FLAG-tagged Rheb WT, S21L, T23M, G29S, Y35N or E40K. 24 h after transfection, cells were transferred to media (Ham's F12 from Life Technologies, Cat. No. 11765054) containing 10%, 1%, 0.5% or 0% foetal bovine serum, as indicated. Cells were trypsinized and counted on a haemocytometer every 24 h for 7 days. Growth medium was changed every 2 days.

Results

Figure 3:
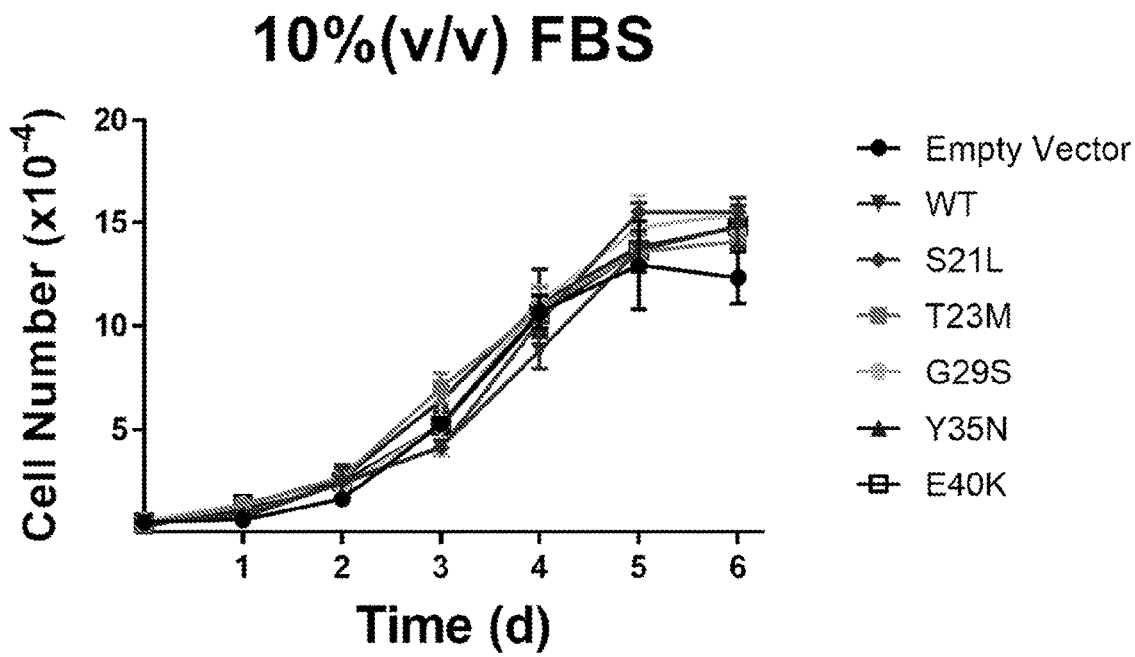
FIG. 3 shows that overexpressing Rheb-T23M in CHO cells allows the cells to grow efficiently in serum-free medium. CHO cells were seeded into 24-well plates at 5,000 cells/well. 24 h after seeding, cells were transfected using Lipofectamine3000 with an empty vector or vectors for Rheb WT, S21L, T23M, G29S, Y35N or E40K. 24 h after transfection, cells were transferred to medium containing 10%, 1%, 0.5% or 0% FBS as indicated. Every 24 h for 7 days, cells were trypsinized (from different dishes on each occasion) and counted on a haemocytometer. Growth medium was changed every 2 days. Cells grown in medium (Ham's F12) supplemented with 10% or 1% FBS showed no significant 'growth' inhibition and no advantage in terms of cell number was conferred by any of the Rheb mutants (A,B). There was significant impairment of cell proliferation when cells were maintained in 0.5% FBS with the exception of cells expressing Rheb-T23M which showed substantially greater proliferation under low serum conditions (C). This growth advantage was even more marked when cells were kept in serum-free medium (D). Thus, overexpressing Rheb-T23M in CHO cells has no effect on cell growth under serum-supplemented culture conditions, but allows CHO cells to grow efficiently in serum-free medium. This contrasts with the situation for wild-type Rheb or other mutants which have a similar, but far smaller effect in promoting cell proliferation under serum-deficient conditions. This effect may be highly advantageous for the propagation of CHO cells under industrial conditions in defined or minimal media.
Figure 3:
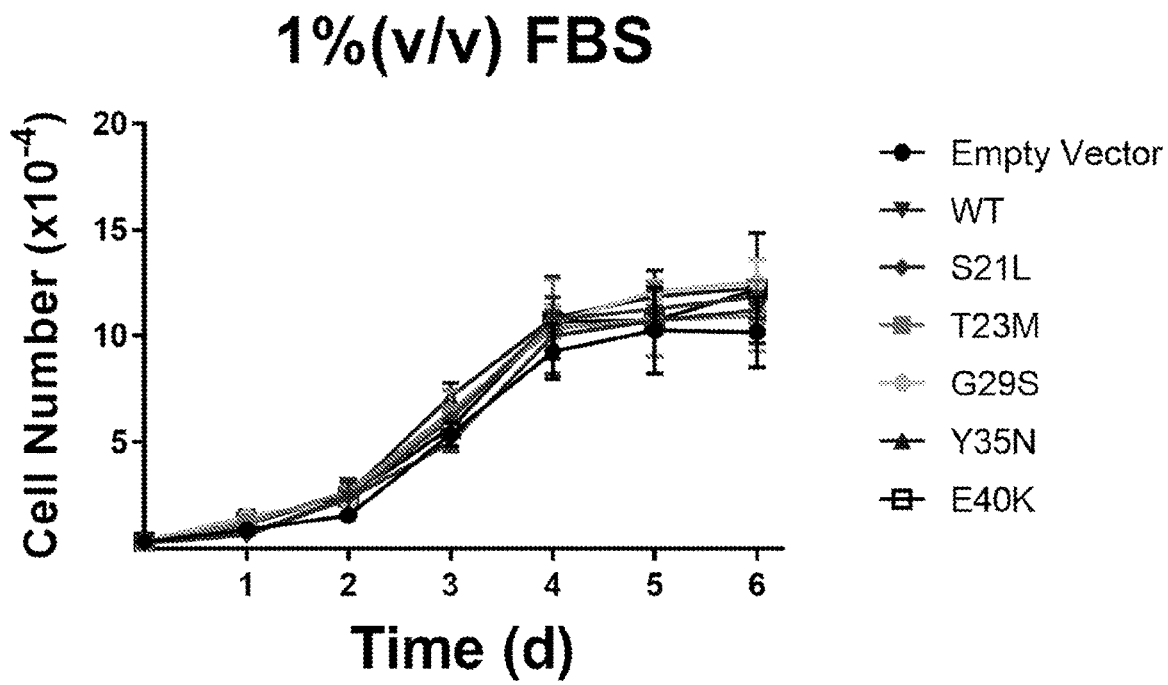
Figure 3:
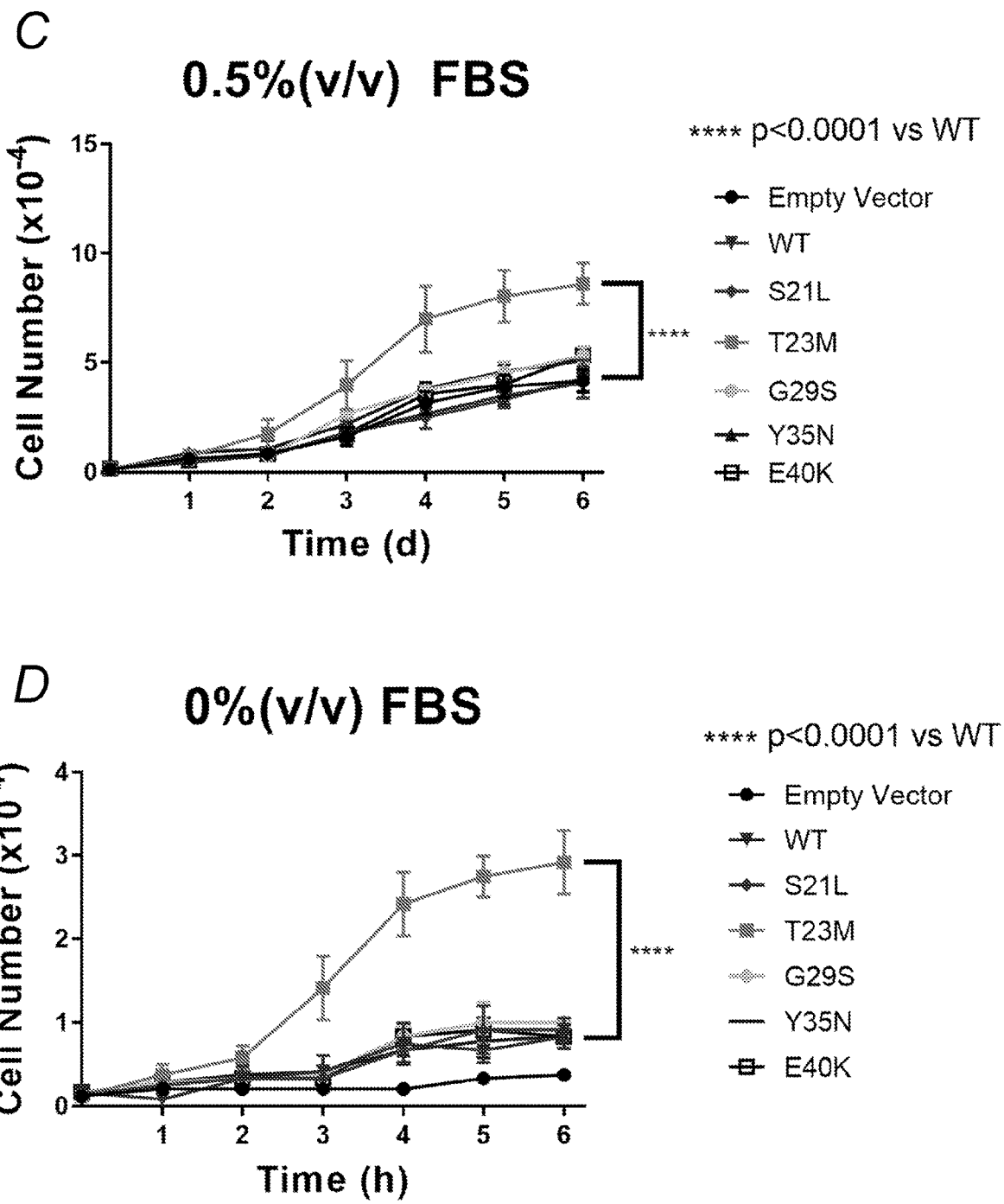

The results are shown in FIG. 3.

Cells grown in medium supplemented with 10% and 1% FBS showed no significant inhibition to growth and no growth advantage conferred by any of the Rheb mutants. There was significant growth inhibition when cells were maintained in 0.5% FBS with the exception of cells expressing Rheb-T23M which showed a significant growth advantage over the other Rheb mutants. This growth advantage was even more marked when grown in serum-free medium.

Conclusion

Overexpressing Rheb-T23M in CHO cells has no effect on cell growth under serum-supplemented culture conditions, but allows CHO cells to grow efficiently in serum-free medium.

Example 4—Rheb T23M Selectively Promotes Production of the Secreted Protein *Gaussia* Luciferase Materials and Methods Constructs were introduced into CHO cells using Lipofectamine3000 (Life Technologies) according to the manufacturer's protocol. Cell lines stably expressing secreted luciferase were generated by cloning the GLuc gene with a signal sequence from Nanolight Technology (see paper sent with this version) and cloning this into the pcDNA4 commercially available vector where gene expression was driven by a CMV promoter. The subsequent vectors were transfected, using lipofectamine, into CHO-S freestyle suspension cells and grown in CD-CHO media and then stable transfectant pools selected by addition of zeocin antibiotic. Once stable pools had emerged these were subjected to limited dilution cloning to obtain a range of pools with different secreted GLuc expression levels. Methods as are described, for example, in Josse et al. (2009) *Biotechnology and Bioengineering* 105: 556-566.

For *Gaussia* luciferase, we employed the BioLux® *Gaussia* Luciferase Assay Kit (New England Biolabs (NEB), Cat. No. E3300S) and for firefly luciferase the Luciferase Assay System from Promega (Cat. No. E1500). Cells were grown in Ham's F12 medium F12 nutrient mix, Ham's (Life Technologies, Cat. No. 11765054).

CHO cells stably expressing Firefly luciferase (FLuc; which is cytoplasmic) or *Gaussia* luciferase (GLuc; which is secreted) as indicated were transfected using Lipofectamine3000 with an empty vector (EV) or vectors for Rheb WT, S21L, T23M, G29S, Y35N or E40K and treated with the mTOR inhibitor AZD8055 at 100 nM for the total duration where appropriate. Fluc and GLuc assays were performed at 24 h after transfection and then every 48 h for 7 days. Assay results were normalised to cell number. GLuc-CHO cells were harvested for SDS-PAGE and Western Blot analysis at the 168 h (7-day) timepoint to probe for intracellular GLuc, FLAG (Rheb) and actin, as 'loading control'.

Results

Figure 4:
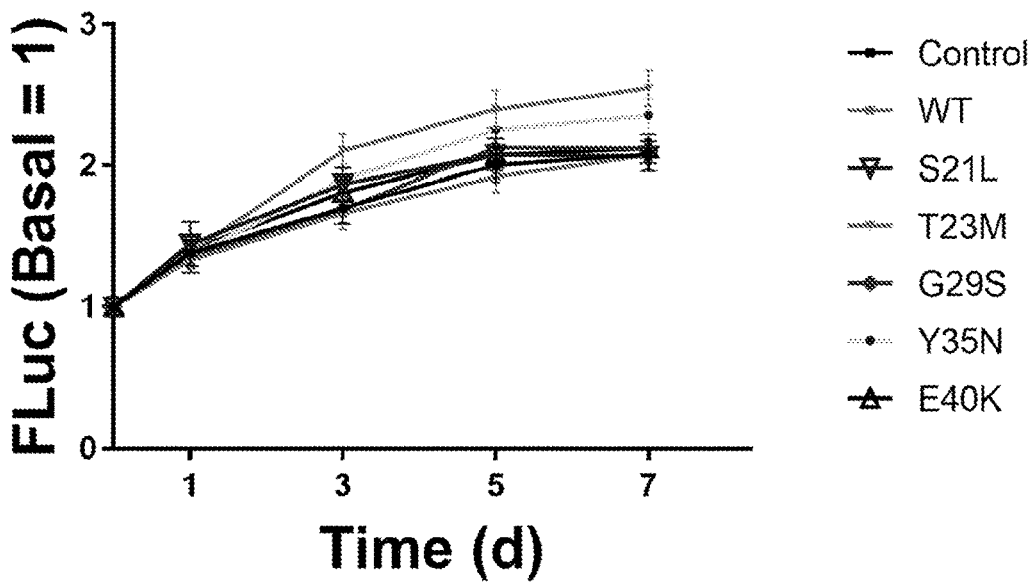
FIG. 4 shows that Rheb [T23M] selectively promotes production of the secreted protein *Gaussia* luciferase (GLuc) in a process that requires mTOR signalling. CHO cells stably expressing Firefly luciferase (FLuc) or *Gaussia* luciferase (GLuc) as indicated were transfected using Lipofectamine3000 with an empty vector (EV) or vectors for Rheb WT, S21L, T23M, G29S, Y35N or E40K and also treated with the mTOR inhibitor AZD8055 at 100 nM for the total duration where indicated. Fluc and GLuc assays were performed 24 h after transfection and then every 48 h for 7 days. Assay results are normalised to cell number. GLuc-CHO cells were harvested for SDS-PAGE and Western Blot analysis at the 168 h (7-day) time-point to probe for intracellular GLuc, FLAG (Rheb) and actin, as 'loading control'. Rheb-T23M and -Y35N caused a small (ca. 1.2-fold) increase in synthesis of intracellular Firefly luciferase compared to the empty vector (A/B [B shows a histogram at day 7]). However, Rheb-T23M and —Y35N caused a significant 3-fold increase in secreted *Gaussia* luciferase that was also seen with E40K and was prevented by treatment with AZD8055 (C/D [histogram of day 7]). In (E), secreted GLuc was monitored every 4 h from 24 h to 60 h showing the rate of secretion of GLuc was higher when Rheb-T23M is expressed as compared to Rheb-Y35N. The pattern for intracellular levels of *Gaussia* luciferase (assessed by immunoblot of cell lysates harvested at 7 days post transfection) more closely resemble those intracellular firefly luciferase (F) with little change compared to either the empty vector or WT while still retaining heightened mTORC1 signalling as indicated by the elevated levels of P-S6K1 Thr389 compared to cells transfected with the empty vector. CHO cells expressing Rheb-T23M, Y35N and E40K show a small increases in general protein synthesis but a marked increase in secreted *Gaussia* protein that is blocked by mTOR inhibition. Thus, Rheb[T23M] selectively promotes production of the secreted protein GLuc in a process that requires mTOR signalling.
Figure 4:
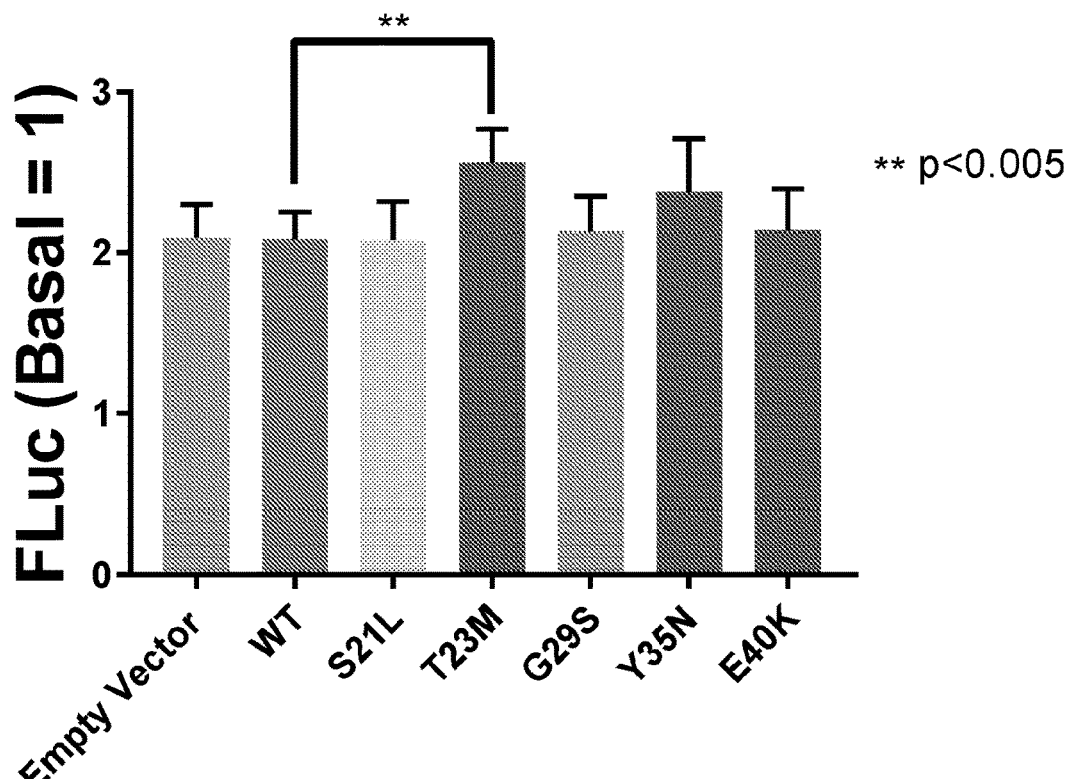
Figure 4:
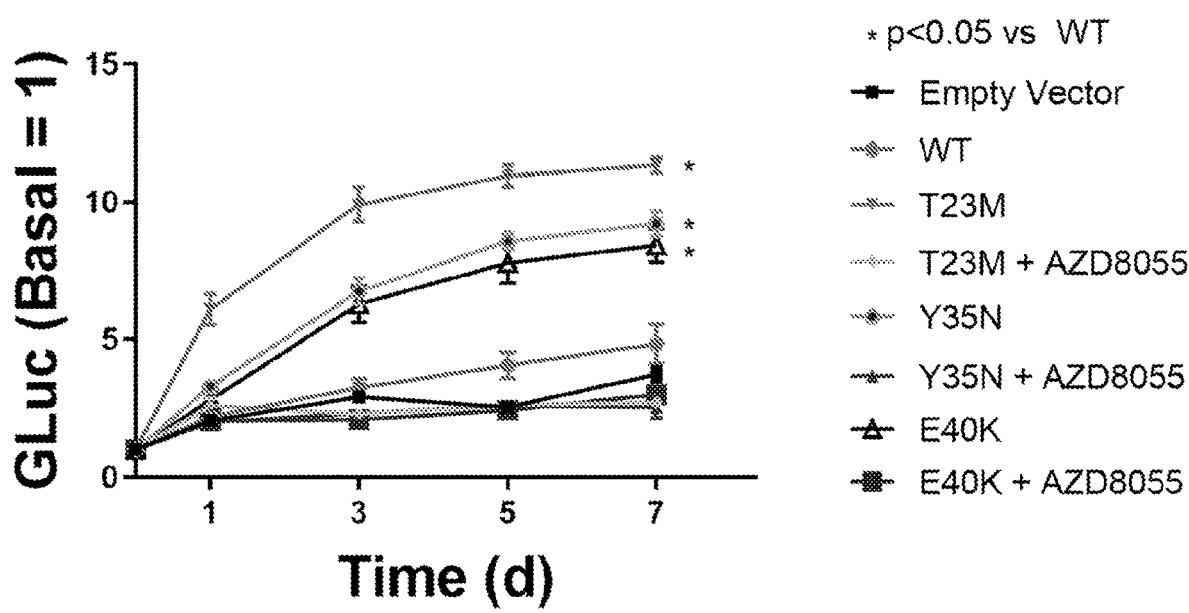
Figure 4:
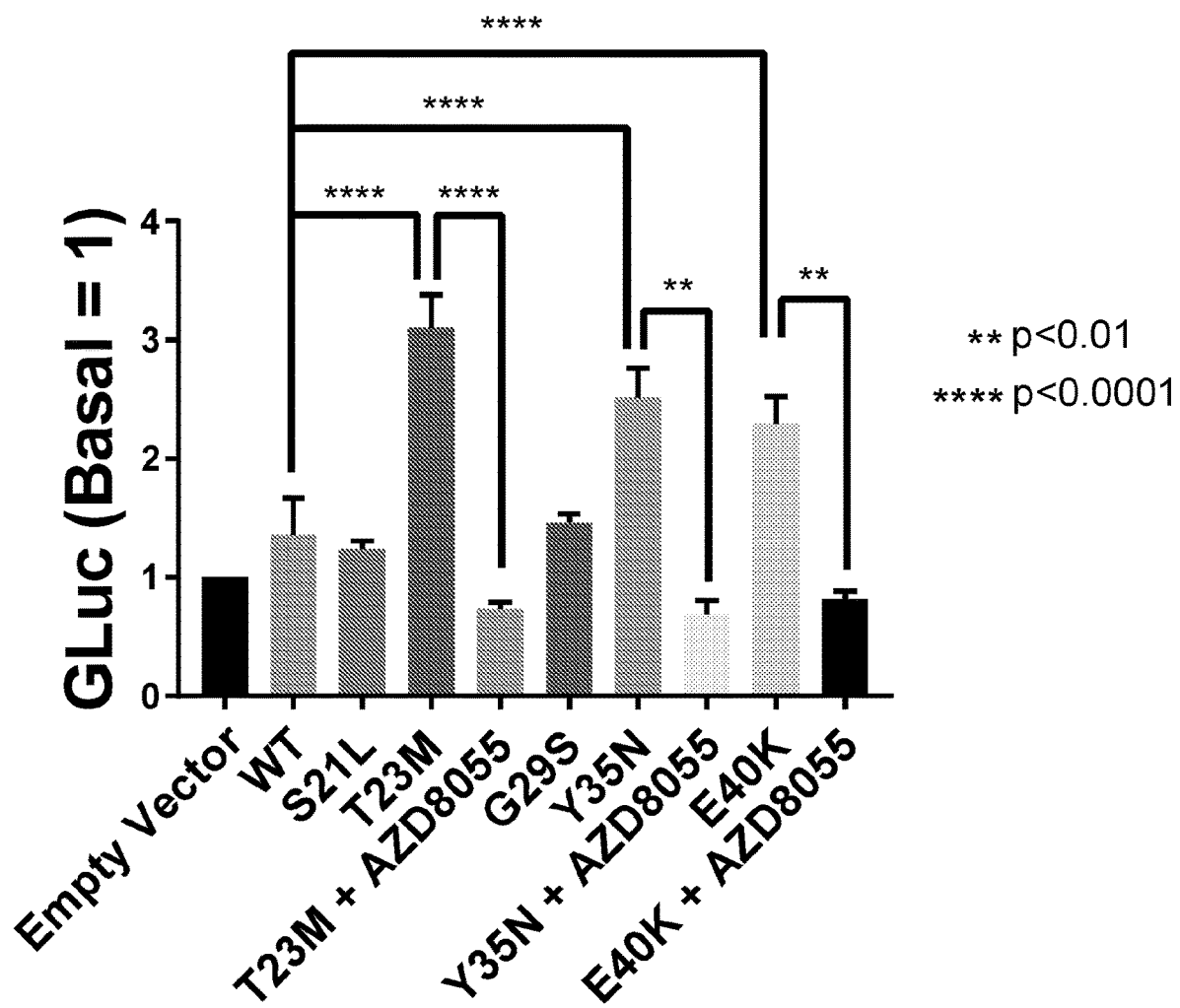
Figure 4:
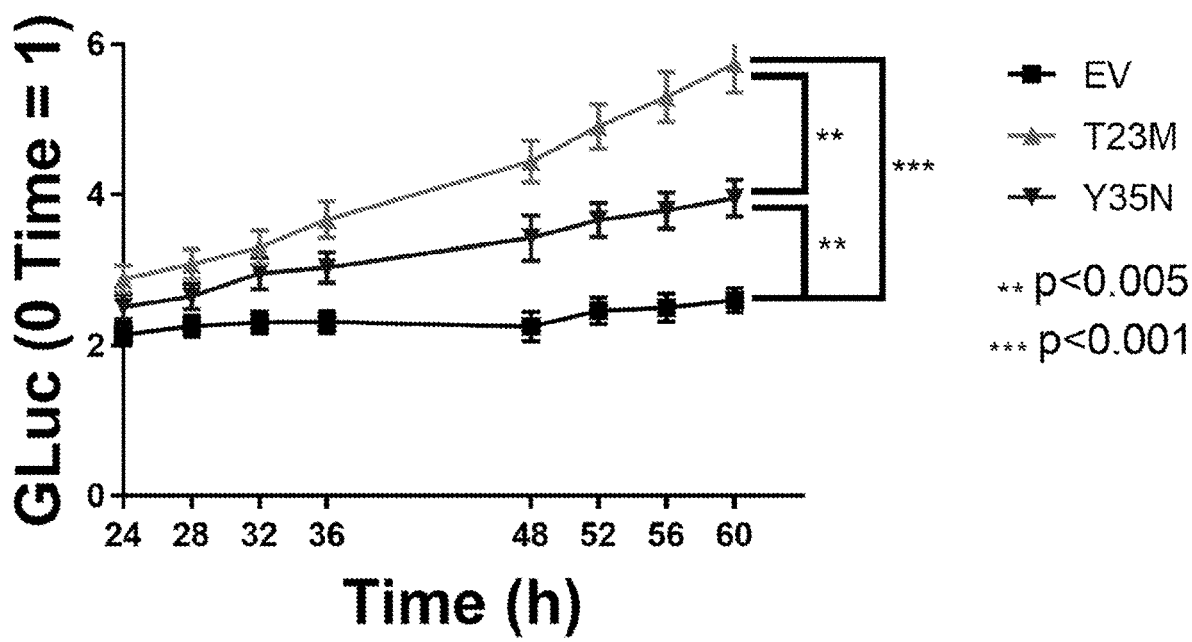
Figure 4:
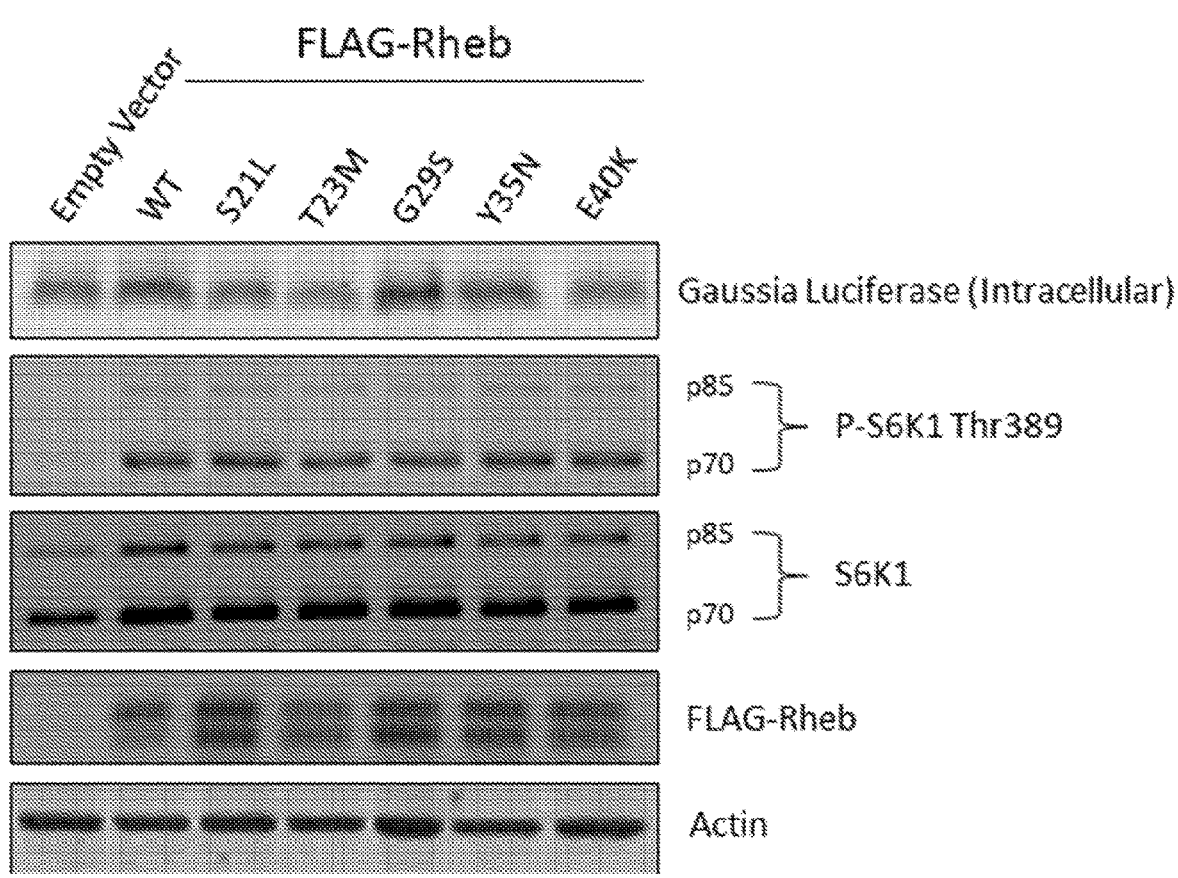
Figure 5:
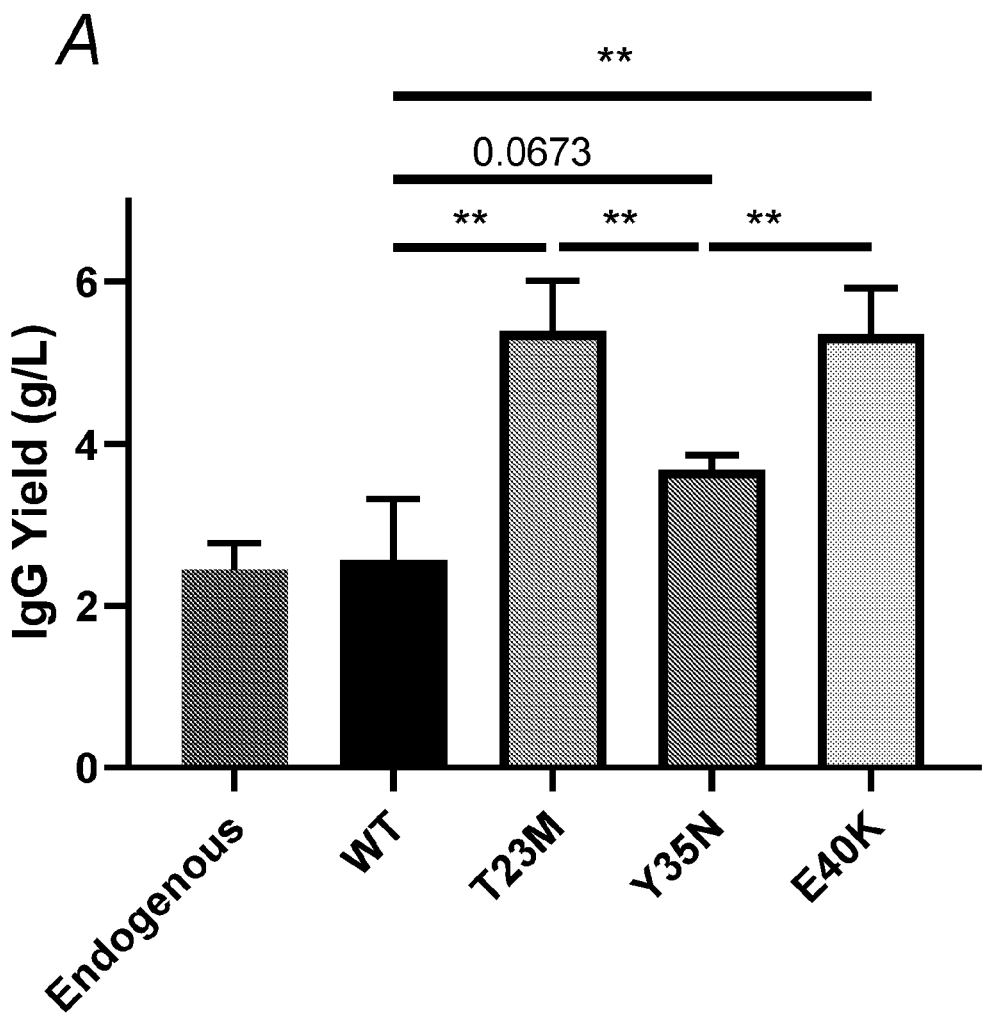
FIGS. 5A-5C show the yield of secreted IgG obtained using non-adherent CHO cells expressing either wild-type Rheb or variants T23M, Y35N, or E40K.
Figure 5:
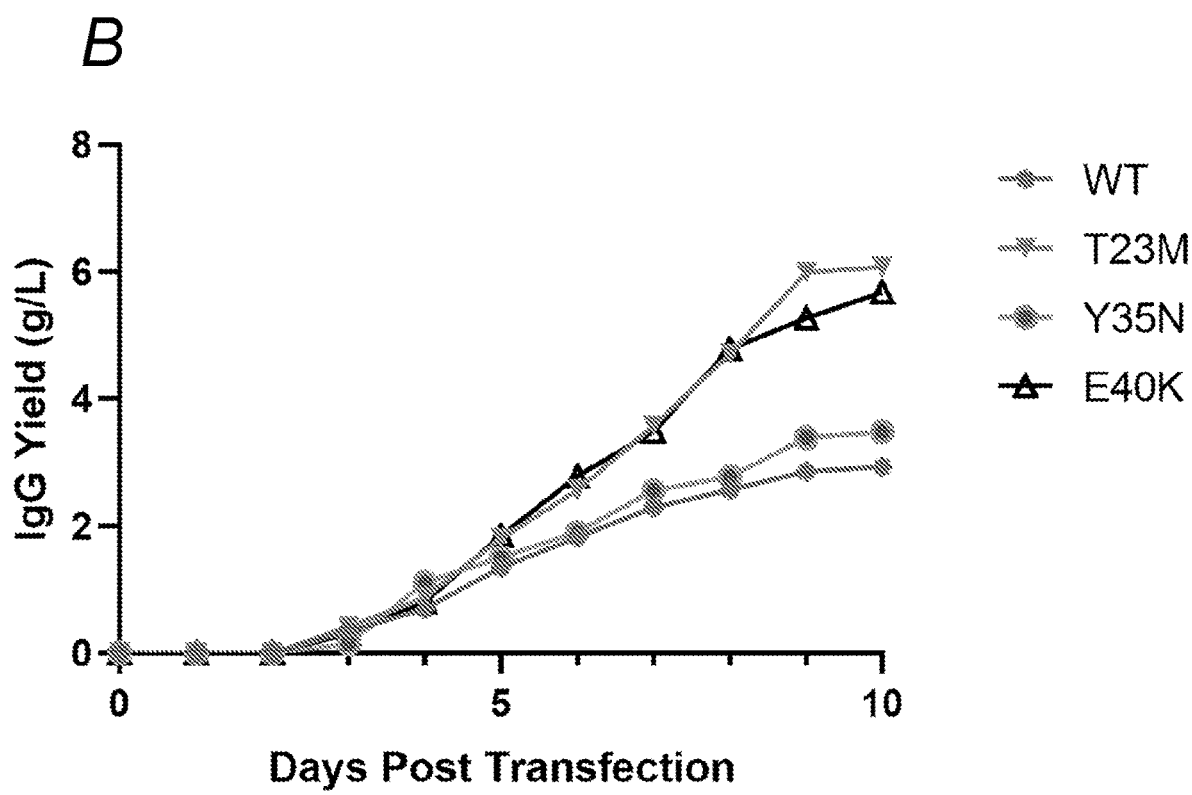
Figure 5:
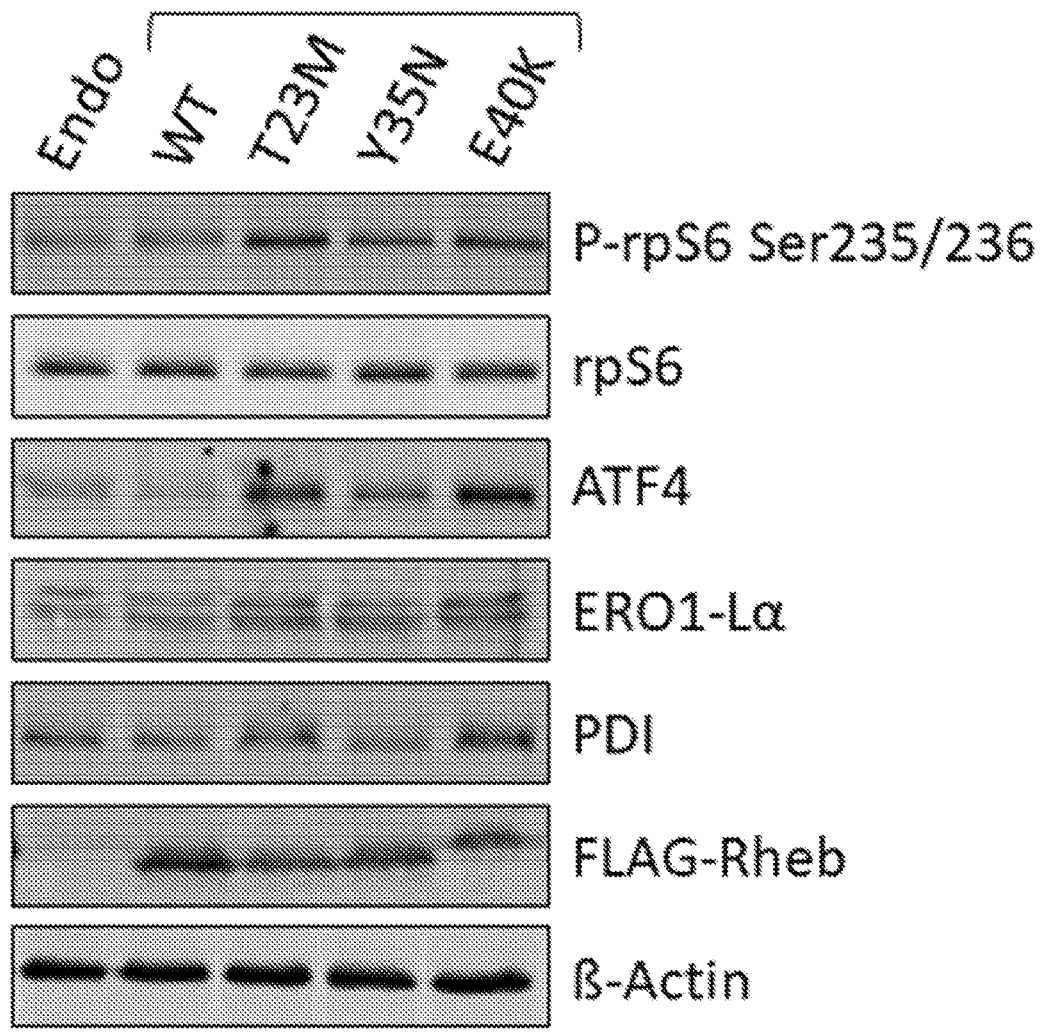

The results are shown in FIG. 4.

Rheb-T23M and -Y35N caused a small (ca. 1.2-fold) increase in synthesis of intracellular Firefly luciferase compared to the empty vector (A/B [histogram of day 7]) but a significant 3-fold increase in secreted *Gaussia* luciferase that was also seen with E40K and was prevented by treatment with AZD8055 (C/D [histogram of day 7]). In (E), secreted GLuc was monitored every 4 hours from 24 hours to 60 hours showing the rate of secretion of GLuc was higher when Rheb-T23M is present compared to Rheb-Y35N. Intracellular levels of *Gaussia* luciferase (assessed by immunoblot of cell lysates harvested at 7 days post transfection) more closely resemble intracellular firefly luciferase (F) with little change compared to either the empty vector or WT while still retaining heightened mTORC1 signalling as seen through elevated levels of P-S6K1 Thr389 compared to the empty vector.

Conclusion: CHO cells expressing Rheb-T23M, Y35N and E40K show a small increase in general protein synthesis but a marked increase in secreted protein that is blocked by mTOR inhibition. Thus, Rheb[T23M] selectively promotes production of the secreted protein GLuc in a process that requires mTOR signalling. The results demonstrate that Rheb-T23M, Y35N or E40K can be used to improve the secretion of proteins generally, and that the use of these Rheb mutants in cells has utility for improving production of secreted proteins in cells.

Example 5—Expression of a Monoclonal Antibody in Cells Expressing Rheb-T23M, Y35N or E40K 1. Protocols for Transient Expression of Monoclonal Antibodies in 293ENBA Cells and a Scale-Up Process Using WAVE Disposable Bioreactors 2 Materials 2.1 Cell Lines, Expression Vectors, Transfection Reagents
Cell lines: HEK293 cell line stably expressing EBV nuclear antigen-1 (EBNA-1) and Rheb T-23M, Y35N or E40K, produced essentially as described in Example 2.
  1. HEK293E (Invitrogen).
  2. 293-6E (NRC-BRI).
Expression vectors: CMV-based expression vectors, contains EBV replication origin, oriP.
  1. pTT5 (NRC-BRI).
  2. pCEP4 (Invitrogen).
Transfection Reagents:
  1. FuGENE HD (Roche Biosciences).
  2. PEI Max (Polysciences Inc.), 1 mg/mL stock in water.
  3. PEI, 25 kDa linear (Polysciences Inc.), 1 mg/mL stock in water.
  4. X-tremeGENE HP (Roche Biosciences).
2.2 Cell Culture Media and Media Supplements
Culture Media:
  1. Freestyle 293 (Invitrogen/Gibco), supplemented with 25 µg/mL G418 and 0.1% Pluronic F68.
  2. F17 (Invitrogen/Gibco), supplemented with 25 µg/mL G418, 8 min 1-glutamine, and 0.1% Pluronic F68.
Media Supplements:
  1. Pluronic F-68.
  2. DMSO (Hybri-max).
  3. G418 sulfate solution.
4.1-Glutamine, 200 min solution.
  5. Penicillin—streptomycin, 100×.
  6. Trypan blue, 0.4% solution in PBS.
  7. Sodium-n-butyrate.
  8. Sodium azide.
  9. Tryptone N1 (Organotechnic, SAS, France), sterile 20% solution (w/v).
2.3 Equipment and Disposable Plastic-Wares
  1. Biological safety cabinet, laminar flow.
  2. $CO_2$ incubators.
  3. $CO_2$ reach-in incubators with reinforced shelves (Thermo-Forma, Model #3950).
  4. Orbital shakers with sticky pad platform (Innova 2100, New Brunswick Scientific).
  5. Cedex HiRes Cell Counter (Innovatis).
  6. Table-top centrifuge (Beckman Coulter, Allegra X-12R).
  7. Floor model centrifuge (Beckman Coulter, Avanti J-HC).
  8. Octet RED96 (ForteBIO).
  9. 1 L centrifuge bottles (NalGENE).
  10. Plastic disposable shake-flasks, Erlenmeyer, 125-3,000 mL.
  11. MiniKros Plus tangential flow filtration module (Spectrum Laboratories, Inc.).
  12. DIP AND READ™ Biosensors, protein A and protein G (ForteBIO).

2.4 WAVE Bioreactor, Culture Bags, and Accessories
  1. WAVE 20/50 base system with dual bag temperature and aeration controls, optional Loadcell module (GE WAVE).
  2. WAVE 50 L platform with dual bag temperature sensors (GE WAVE).
  3. $CO_2$—air mixture controller and aeration pump (GE WAVE).
  4. 22 L WAVE culture bags (GE WAVE).
  5. Electric exhaust filter heater (GE WAVE).
  6. Tube welder (SCD IIB, TERUMO).
  7. Sterile 2 L transfer bottle (Sani-tech West, custom designed).

3. Methods 3.1 Plasmid DNA Preparation for Transient Transfection
  1. For transient expression of monoclonal antibodies, antibody heavy and light chain cDNAs may be cloned separately into expression vectors such as pCEP4 or pTT5.
  2. Plasmid DNA used for transient expression may be prepared using either the Endo-Free plasmid preparation kits from Qiagen or PureLink™ Hi Pure plasmid preparation kits from Invitrogen (also see Notes 9 and 10).
3.2 Culturing 293EBNA Cells
3.2.1 Cell Thawing and Routine Maintenance
  1. Prepare a disposable T25 tissue culture flask containing 10 mL of FreeStyle 293 medium or 10 mL of F17 medium. Place the T25 flask in a 37° C. $CO_2$ incubator for 30 min to pre-warm.
  2. Quickly thaw one vial of frozen 293EBNA cells ($1$-$2.5 \times 10^7$ cells/vial). Transfer the entire content of the vial into the T25 flask with pre-warmed media. Place the T25 flask into a 37° C. $CO_2$ incubator overnight.
  3. The next day, remove the T25 flask from the incubator and gently tap the flask to dislodge the cells from the bottom of the flask. Transfer the entire contents into a sterile 50 mL conical tube.
  4. Remove 0.5 mL of cell culture to determine viable cell density (VCD) and cell viability using either the Cedex HiRes cell counter or a hemocytometer.
  5. Centrifuge the 50 mL conical tube in the tabletop centrifuge at 233 g for 5 min Discard the culture supernatant.
  6. Resuspend the 293EBNA cell pellet in pre-warmed culture media. Adjust the final viable cell concentration to $0.5$-$0.8 \times 10^6$/mL. If the final volume is below 20 mL, transfer the culture to a $T_{125}$ shake-flask. If the final volume is between 20 and 50 mL, transfer the culture to a $T_{250}$ shake-flask.
  7. Monitor VCD and cell viability every day. 293EBNA cells should double every 24-30 h and reach $2$-$2.5 \times 10^6$/mL within 3-4 days. Dilute cell cultures back to $0.5 \times 10^6$/mL with fresh media and transfer to larger flasks as needed.
  8. The 293EBNA cells should reach a viability of above 95% within 3-5 days after thawing. If the cells fail to reach 95% viability within a week after thawing or cell doubling times are longer than 48 h, discard the culture; a new vial should be thawed or a better frozen stock of 293EBNA cells obtained.
  9. For routine maintenance of 293EBNA cells, the VCD may be kept between 0.5 and $2.5 \times 10^6$/mL. Cells may be split every 2-3 days.
  10. To prepare cells for transfection in shake-flasks, cells should be diluted with fresh medium to $0.8$-$1 \times 10^6$/mL 24 h prior to transfection. The ideal cell density for transfection is $1.5$-$2.0 \times 10^6$/mL and cell viability should be more than 95%.

3.2.2 Cell Freezing

1. Freeze 293EBNA cells only when they are at exponential growth phase (1-1.5×10$^6$/mL) and exhibit a doubling time of <30 h. The viability of the cells should not be lower than 98%.
2. Determine the total number of cells in the culture. Centrifuge the cells at 233×g for 5 min. Discard the supernatant.
3. Prepare cell freezing medium by mixing equal volumes of conditioned medium and fresh cell culture medium. Add DMSO (HybriMax) to a final concentration of 10% (v/v).
4. Resuspend the cell pellet in the cell freezing medium to a final concentration of 10-25×10$^6$/mL. Aliquot 1 mL each into 1.8 mL cryovials. Place the vials into a styrofoam box and transfer the box to a −80° C. freezer.
5. Transfer the vials into liquid nitrogen freezer within 48-96 h.

3.3 Small- to Mid-Scale Transfection in Shake-Flasks

Small- to mid-scale transient transfections may be performed using various sizes of disposable shake-flasks. Transfection volumes can vary from 20 mL in a T$_{125}$ shake-flask to 1,000 mL in a 3 L shake-flask. Here, a protocol for transient transfection in a 300 mL volume in a 1 L shake-flask is provided.

For monoclonal antibody (mAb) expression, the antibody heavy and light chains are cloned into separate vectors and co-transfected into the 293EBNA cells. A 1:1 ratio (w/w) of antibody HC and LC is routinely used for transfection. Total DNA concentrations used for transfection may vary from 0.5 to 2 μg/mL, while 3 μl of Fugene HD or X-tremeGENE HP may be used for every 1 μg of DNA. If PEI (PEI Max) is used for transfection reagent, the DNA/PEI (w/w) ratio is usually set for 1:3.

3.3.1 DNA/Transfection Reagent Complex Formation

1. For optimal transfection efficiency, DNA and transfection reagents need to be diluted in complex medium in separate containers before mixing together. Both F17 and FreeStyle 293 media may be used as complex medium. These media should be pre-warmed to 37° C. in a waterbath.
2. For a 300 mL transient transfection in a 1 L shake-flask, 300 μg of DNA (150 μg each of HC and LC plasmid) may be diluted in 7.5 mL of pre-warmed complex medium (25 μl of complex medium for every 1 μg of DNA) in a 50 mL conical tube. Shake the tube gently to mix the contents.
3. In a separate 50 mL conical tube, add 900 μl of Fugene HD or X-tremeGENE HP into 7.5 mL of complex medium and mix the contents thoroughly. If PEI (PEI Max) is used for transfection, 900 μg PEI or PEI Max (0.9 mL of 1 mg/mL solution) should be diluted into 7.5 mL of complex medium.
4. Add diluted transfection reagent into the tube with diluted DNA and mix thoroughly. Incubate at room temperature for 10 min before adding the entire mixture to the 293EBNA cells.

3.3.2 Transfection in Shake-Flasks 1. 24 h before transfection, split 293EBNA cells with fresh medium and seed 300 mL of cells in a 1 L shake-flask. The final VCD should be around 0.7-1×10$^6$/mL.
2. The next day before transfection, check the viable density and cell viability. The VCD of the cells should be around 1.4-2×10$^6$/mL and the viability should be above 95%.
3. Prepare DNA/transfection reagent complex as described in 3.3.1 and add the complex directly into the 293EBNA cells in the 1 L shake-flask. Shake gently to mix.
4. Place the shake-flask on an orbital shaker inside the CO$_2$ reach-in incubator. The shaker speed should be set between 100 and 120 rpm.

3.3.3 Feeding and Harvesting 1. 24 h post-transfection, feed the transfected cells with 7.5 mL of 20% TN-1 (0.5% final concentration).
2. Monitor VCD and cell viability on a daily basis or every other day. Typically, transfected 293EBNA cells should maintain viabilities between 70 and 90% in the first 3 days. After day 4, the viability will drop fairly significantly.

Harvesting is usually done on day 6 or 7 post-transfection or when cell viability drops below 25%. Transfer the entire culture into a 1 L centrifuge bottle and centrifuge at 5,000×g for 20 min in a floor model Beckman Coulter centrifuge.
4. The conditioned medium is collected and ready for purification. A small aliquot is removed for antibody quantification using Octet Red96.
5. If the conditioned medium is not immediately processed, it should be sterilized by passing through a 0.2 μm filter unit and store at 4° C. Alternatively, sodium azide (NaN3) should be added to a final concentration of 0.01% to prevent bacteria growth.

3.3.4 Determination of Optimal Transfection Parameters

Several parameters will impact transient transfection yields significantly. These include the amount of DNA, the HC/LC plasmid DNA ratio and the ratio of DNA/transfection reagents. In order to obtain optimal expression yields, in particular when large amounts of recombinant antibody are needed via transient expression, it is necessary to optimize these transfection parameters. A two-step protocol is provided for optimizing the transfection parameters.

1. The first step is to optimize the total DNA concentrations and DNA/transfection agent ratios used for complex formation.
2. Table 1 provides one such example. Four different DNA concentrations are included in the test ranging from 0.5 to 2 μg/mL in combinations with four different DNA/PEI ratios ranging from 1:3 to 1:6. The HC and LC ratio is fixed at 1:1 in the first step.

TABLE 1

Optimizing total DNA concentrations and DNA/PEI ratios for 293EBNA transient transfection

| DNA/PEI ratio | DNA conc. (μg/ml) | Transfection volume | DNA (μg) (HC:LC = 1:1) | PEI conc. (μg/ml) | PEI (μg) | Complex media (μl) |
|---|---|---|---|---|---|---|
| 1 to 3 | 0.5 | 10 | 5 | 1.5 | 15 | 125 |
| 1 to 4 | 0.5 | 10 | 5 | 2 | 20 | 125 |
| 1 to 5 | 0.5 | 10 | 5 | 2.5 | 25 | 125 |
| 1 to 6 | 0.5 | 10 | 5 | 3 | 30 | 125 |
| 1 to 3 | 1 | 10 | 10 | 3 | 30 | 250 |
| 1 to 4 | 1 | 10 | 10 | 4 | 40 | 250 |
| 1 to 5 | 1 | 10 | 10 | 5 | 50 | 250 |
| 1 to 6 | 1 | 10 | 10 | 6 | 60 | 250 |
| 1 to 3 | 1.5 | 10 | 15 | 4.5 | 45 | 375 |
| 1 to 4 | 1.5 | 10 | 15 | 6 | 60 | 375 |
| 1 to 5 | 1.5 | 10 | 15 | 7.5 | 75 | 375 |
| 1 to 6 | 1.5 | 10 | 15 | 9 | 90 | 375 |
| 1 to 3 | 2 | 10 | 20 | 6 | 60 | 500 |
| 1 to 4 | 2 | 10 | 20 | 8 | 80 | 500 |
| 1 to 5 | 2 | 10 | 20 | 10 | 100 | 500 |
| 1 to 6 | 2 | 10 | 20 | 12 | 120 | 500 |

If Fugene HD or X-tremeGENE HP is used as the transfection reagent, the optimization of DNA/transfection reagent ratio should be optimized according to manufacturer's protocols.

4. Protocols described in Subheadings 3.3.1-3.3.3 may be followed for the transient expression tests. Based on final expression yields, the best combination of DNA concentration and DNA/transfection reagent ratio will be chosen.

5. The second step is to test the various HC and LC DNA ratios used in transfection. Table 2 provides another example.

TABLE 2

Optimizing antibody heavy and light chain ratios for 293EBNA transient transfection

| HC/LC ratio (w/w) | DNA conc. (µg/ml) | Transfection Volume (ml) | HC DNA (µg) | LC DNA (µg) | PEI (µg) | Complex media (µl) |
|---|---|---|---|---|---|---|
| 2 to 1 | 1 | 10 | 6.6 | 3.4 | 30 | 250 |
| 3 to 2 | 1 | 10 | 6 | 4 | 30 | 250 |
| 1 to 1 | 1 | 10 | 5 | 5 | 30 | 250 |
| 2 to 3 | 1 | 10 | 4 | 6 | 30 | 250 |
| 1 to 2 | 1 | 10 | 3.4 | 6.6 | 30 | 250 |
| 2 to 5 | 1 | 10 | 2.8 | 7.2 | 30 | 250 |
| 1 to 3 | 1 | 10 | 2.5 | 7.5 | 30 | 250 |
| 2 to 7 | 1 | 10 | 2.2 | 7.8 | 30 | 250 |
| 1 to 4 | 1 | 10 | 2 | 8 | 30 | 250 |

Several methodologies can be employed to further improve the transient expression level for recombinant antibodies. These include co-transfections of cell cycle regulators and growth factors (27, 29 see Backliwal et al. (2008) Rational vector design and multi-pathway modulation of HEK 293E cells yield recombinant antibody titers exceeding 1 g/L by transient transfection under serum-free conditions. Nucleic Acids Res 36:e96; Backliwal et al. (2008) Coexpression of acidic fibroblast growth factor enhances specific productivity and antibody titers in transiently transfected HEK293 cells. Nat Biotechnol 25:162-166), addition of peptones or histone deacetylase inhibitors into the culture medium (see Backliwal et al. (2008) Valproic acid: a viable alternative to sodium butyrate for enhancing protein expression in mammalian cell cultures. Biotechnol Bioeng 101: 182-189; Franek et al. (2000) Plant protein hydrolysates: preparation of defined peptide fractions promoting growth and production in animal cells cultures. Biotechnol Prog 16:688-692; Franek et al. (2003) Enhancement of monoclonal antibody production by lysine-containing peptides. Biotechnol Prog 19:169-174; Wulhfard et al. (2010) Valproic acid enhances recombinant mRNA and protein levels in transiently transfected Chinese hamster ovary cells. J Biotechnol 148:128-132).

8. In some cases, lowering the culture temperature to 31° C. 24 h post-transfection may also prolong survival of the transfected cells and increase expression yields.

3.4 Transfection in WAVE Bioreactors (10 l Working Volume)

3.4.1 WAVE Cellbag Set-Up

1. Operation of WAVE bioreactors and transient transfection protocols may be conducted according to manufacturer's protocols.

2. In a laminar flow hood, remove a 22 L Cellbag from its protective pouch. Check and make sure all the connections and fittings are tight. A 50 L WAVE platform with dual temperature sensors can fit two 22 L Cellbags side by side.

3. Transfer the bag to a 50 L WAVE platform and attach the bag according to manufacturer's instructions.

4. Close the harvest line at a point close to the Cellbag. Attach the electric exhaust filter heater pad to the "Out-let" filter.

5. Connect the central $CO_2$ supply to the "Gas-in" port of the WAVE base 20/50. Alternatively, if a separate $CO_2$ monitor is used, connect to the "Gas-in" port of a $CO_2$-air mixture controller. Connect the "Gas-out" port of the base 20/50 unit or the $CO_2$-air mixture controller to the "inlet" filter of the Cellbag. Engage the "Pump-on" or the "$CO_2$-on" buttons.

6. Set the $CO_2$ output to 5% and flow rate at 0.5 L/min. When the Cellbag is fully inflated, reduce the flow rate to 0.1 L/min.

7. Set the rocking rate between 18 and 22 rpm and the rocking angle at 7-9°. The WAVE bag is ready for cell seeding.

3.4.2 Seeding the WAVE Bioreactor

1. Expand 293EBNA cells in shake-flasks before seeding into the WAVE bioreactors. The cells should be spilt every 24-48 h to maintain their growth in log phase and the cell viability should exceed 97%

2. To seed a WAVE bioreactor with 10 L working volume, a total of 5-6×109 293EBNA cells will be needed. Therefore, 3-4 2 L shake-flasks, each with 600-700 mL 293EBNA cell culture at 2-2.5106/mL VCD, need to be prepared.

3. A custom-designed 2 L transfer bottle (FIG. 3) is used to transfer 293EBNA cell cultures into WAVE bioreactors. This bottle has a cap with a sterile vent and contains a small port at the bottom which is connected with a C-Flex™ tubing for sterile fusing to the feed line on the WAVE Cellbag.

4. On day 1, inside a laminar flow tissue culture hood, remove the vented cap from the 2 L sterile transfer bottle. Pour up to 2 L of 293EBNA cell culture into the transfer bottle. Replace and close the cap of the sterile transfer bottle.

5. Take the transfer bottle out of the hood and to the side of the WAVE bioreactor. Use the TERUMO tube welder to fuse the tubing from the transfer bottle to the feed line of the WAVE Cellbag. Open the tube connections and raise the height of the transfer bottle to transfer the content into WAVE bioreactor via gravity. The bottle can also be placed on an elevated shelf during transfer.

6. If necessary, repeat steps 3 and 4 until all 293ENBA cells are seeded into the Cellbag. Use the same transfer bottle, transfer appropriate amount fresh medium into the Cellbag to dilute the 293EBNA cell density to $1×10^6$/mL. At this time the Cellbag should contain approximately 5-6 L of cell culture.

7. Set temperature control for the Cellbag at 37° C. The shaking speed and shaking angle should be tested and optimized for 293EBNA culture by individual users. However as a default, the shaking speed should be set at 18 rpm and shaking angle should be set at 8°.

8. On day 2 or 24 h after cell seeding, obtain a small sample of the 293EBNA from the sampling port of the Cellbag (FIG. 2) and determine the VCD and cell viability. The cell density should be $1.5-2.0×10^6$/mL and viability should be >92%. Add appropriate amount of fresh medium to the Cellbag to dilute the culture back to $1×10^6$/mL.

9. On day 3 or 48 h post cell seeding, count the cells again and determine the cell viability. The VCD should be 1.5-$2.0×10^6$ and viability should be >88%. The cells are ready to be transfected.

3.4.3 Transient Transfection in 22 L Cellbags

1. Prepare DNA/transfection reagent complex as described previously in Subheading 3.3.1 and transfer the complex solution to Cellbag using the 2 L transfer bottle.

2. On day 1 post-transfection, add TN-1 (20% stock solution) to the culture to a final concentration of 0.5%.

3. Monitor the VCD and cell viability daily post-transfection.

4. Cells can be transfected 24 h after seeding into the Cellbags.

5. Harvest on day 7 post-transfection or when cell viability drops below 20%.

6. Conditioned medium from the Cellbags can be harvested either by centrifugation using the 1 L centrifuge bottles or using the MiniKros Plus tangential flow filtration module according the manufacturer's instructions.

3.5 Estimation of Antibody Expression Levels

1. Recombinant antibody expression levels in the conditioned medium can be estimated using several methods including SDS-PAGE/Western blot analysis, ELISA or Octet™ instruments from ForteBio, according to manufacturer's instructions.

2. The protein A biosensor can be used to measure recombinant human IgG1, 2, mouse IgG2, and rabbit monoclonal antibodies. The protein G biosensor can be used to measure recombinant mouse $IgG_1$ and rat $IgG_1$ and $_2$.

Example 6—Expression of a Model Antibody in a Non-Adherent Cell Line Expressing Various Rheb Variants Materials and Methods: ExpiCHO-S™ cells were purchased from ThermoFischer Scientific and cultured in ExpiCHO™ Expression Medium at 37° C. at 8% $CO_2$. ExpiCHO-S cells stably expressing Rheb-WT, T23M, Y35N or E40K were created by transfecting cells with a plasmid containing a neomycin resistance gene in addition to a FLAG-Rheb-WT or FLAG-Rheb mutant coding sequence. Transfected cells were grown in 600 µg/mL G148 for 6 weeks. Surviving cells were plated as single cells in a 96-well plate and monoclonal colonies selected for FLAG-Rheb expression.

Rabbit IgG secretion was determined using the ExpiCHO™ Expression system according to the manufacturer's instructions. Briefly, ExpiCHO™ cells expressing either endogenous Rheb or stably expressing exogenous Rheb were seeded at $6 \times 10^6$ cells/mL in 25 mL of ExpiCHO™ Expression Medium and transfected with 20 µg of a pcDNA3.1 vector encoding heavy and light chains of Rabbit IgG at a 1:2 ratio of heavy chain:light chain using ExpiFectamine™ CHO Reagent. 24 hours after transfection, cells were feed with ExpiCHO™ Feed and Expi-Fectamine™ CHO Enhancer and transferred to 32° C., 5% $CO_2$. Cells were allowed to grow for 10 days with 100 µL samples taken every day. After 10 days, Cells were pelleted by centrifugation at 4000×g for 30 minutes at 4° C. and the supernatant filtered through a 22 µM PVFD filter and collected. IgG yield was determined using Easy-Titer™ Rabbit IgG Assay kit and calculated from a standard curve.

ExpiCHO™ cells expressing either endogenous Rheb (Endo) or stably expressing Rheb-WT, T23M, Y35N or E40K were harvested for SDS-PAGE and Western Blot analysis by first pelleting the cells via centrifugation and resuspended in lysis buffer and subjected to sonication at 30% power for 15 seconds.

Results: A) ExpiCHO-S™ stably expressing Rheb-T23M and Rheb-E40K increased the yield of Rabbit IgG compared to endogenous Rheb, Rheb-WT or Rheb-Y35N achieving a yield of 5-6 g/L compared to 2-3 g/L. Data represent results for n=3±standard deviation. Significance was calculated using a Student's t-test where *=p<0.05, **=p<0.05. B) Rabbit IgG secretion was determined daily over the course of 10 days. Cells expressing Rheb-T23M and Rheb-E40K maintain a constant rate of IgG secretion over a longer period than cells expressing Rheb-WT or Rheb-Y35N resulting in a greater yield. Data represent the results of a single replicate. C) Western blot analysis for mTORC1 and ER Stress activation markers show increased mTORC1 signalling and mild ER stress response in cells stably expressing Rheb-T23M and E40K.

Conclusion: Rheb-T23M and Rheb-E40K promote a significant increase in IgG secretion in CHO cells in suspension in chemically defined serum free media. The likely mechanism responsible is increased mTORC1 activation resulting in mild ER stress upregulating expression of proteins required for protein folding, in particular the protein disulphide isomerases ERO1-Lα and PDI which are both required for antibody formation.

Although the present disclosure has been described with reference to particular embodiments, it will be appreciated that the disclosure may be embodied in many other forms. It will also be appreciated that the disclosure described herein is susceptible to variations and modifications other than those specifically described. It is to be understood that the disclosure includes all such variations and modifications. The disclosure also includes all of the steps, features, compositions and compounds referred to, or indicated in this specification, individually or collectively, and any and all combinations of any two or more of the steps or features.

Also, it is to be noted that, as used herein, the singular forms "a", "an" and "the" include plural aspects unless the context already dictates otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Reference to any prior art in this specification is not, and should not be taken as, an acknowledgment or any form of suggestion that this prior art forms part of the common general knowledge in any country.

The subject headings used herein are included only for the ease of reference of the reader and should not be used to limit the subject matter found throughout the disclosure or the claims. The subject headings should not be used in construing the scope of the claims or the claim limitations.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Future patent applications may be filed on the basis of the present application, for example by claiming priority from the present application, by claiming a divisional status and/or by claiming a continuation status. It is to be understood that the following claims are provided by way of example only, and are not intended to limit the scope of what may be claimed in any such future application. Nor should the claims be considered to limit the understanding of (or exclude other understandings of) the present disclosure. Features may be added to or omitted from the example claims at a later date.

The invention claimed is:

1. A method of producing a selected protein, the method comprising:
    expressing the selected protein in a cell expressing a Rheb (Ras homologue enriched in brain) protein having an activity to increase protein production in the cell; and
    secreting the selected protein from the cell;
thereby producing the protein,
    wherein the Rheb protein comprises an amino acid sequence having at least 90% sequence identity to the amino acid sequence of SEQ ID NO: 2 and comprises a methionine at amino acid residue 23 of SEQ ID NO: 2 or a lysine at amino acid residue 40 of SEQ ID NO: 2, and
    wherein the selected protein is an exogenous protein.

2. The method according to claim 1, wherein the Rheb protein comprises an activity to increase synthesis and/or secretion of the selected exogenous protein in the cell.

3. The method according to claim 1, wherein the Rheb protein comprises the amino acid sequence of SEQ ID NO: 2 comprising a methionine at amino acid residue 23 or a lysine at amino acid residue 40.

4. The method according to claim 1, wherein the cell is an adherent cell.

5. The method according to claim 1, wherein the Rheb protein is expressed from a vector comprising a nucleic acid encoding the Rheb protein.

6. The method according to claim 1, wherein the selected exogenous protein comprises an antibody or a therapeutic protein.

7. The method according to claim 1, wherein the Rheb protein is expressed from an endogenous gene altered to encode a Rheb protein having an activity to increase protein production in the cell.

* * * * *